US011893767B2

(12) United States Patent
Li et al.

(10) Patent No.: US 11,893,767 B2
(45) Date of Patent: Feb. 6, 2024

(54) TEXT RECOGNITION METHOD AND APPARATUS

(71) Applicant: HUAWEI TECHNOLOGIES CO., LTD., Guangdong (CN)

(72) Inventors: Jieming Li, Shenzhen (CN); Jianchao Huang, Shenzhen (CN); Xing Zhou, Shenzhen (CN); Yongfei Pu, Shenzhen (CN); Yuanlin Chen, Shenzhen (CN); Lifei Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/837,231

(22) Filed: Jun. 10, 2022

(65) Prior Publication Data
US 2022/0301328 A1 Sep. 22, 2022

Related U.S. Application Data

(63) Continuation of application No. PCT/CN2020/130217, filed on Nov. 19, 2020.

(30) Foreign Application Priority Data

Dec. 13, 2019 (CN) .......................... 201911285619.0

(51) Int. Cl.
*G06V 10/26* (2022.01)
*G06V 30/146* (2022.01)
(Continued)

(52) U.S. Cl.
CPC .......... *G06V 10/267* (2022.01); *G06F 18/241* (2023.01); *G06V 10/22* (2022.01);
(Continued)

(58) Field of Classification Search
CPC ...... G06V 10/267; G06V 10/22; G06V 20/62; G06V 30/1473; G06V 30/153;
(Continued)

(56) References Cited

U.S. PATENT DOCUMENTS

| 7,400,768 B1 * | 7/2008 | Mayzlin ........... G06V 30/18076 |
| | | 382/177 |
| 10,706,322 B1 * | 7/2020 | Yang ...................... G06V 10/82 |

(Continued)

FOREIGN PATENT DOCUMENTS

| CN | 107169494 A | 9/2017 |
| CN | 110147786 A | 8/2019 |

(Continued)

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

(Continued)

*Primary Examiner* — Siamak Harandi
*Assistant Examiner* — Daniella M. DiGuglielmo

(57) ABSTRACT

A text recognition method and apparatus disclosed. The text recognition method includes: obtaining a to-be-detected image; determining a target text detection area in the to-be-detected image, where the target text detection area includes target text in the to-be-detected image, and the target text detection area is a polygonal area including m vertex pairs, m being a positive integer greater than 2; correcting the polygonal area to m−1 rectangular areas to obtain a corrected target text detection area; and performing text recog-
(Continued)

nition on the corrected target text detection area to determine the target text, and outputting the target text.

21 Claims, 16 Drawing Sheets

(51) Int. Cl.
| | |
|---|---|
| *G06V 30/148* | (2022.01) |
| *G06V 10/22* | (2022.01) |
| *G06V 30/19* | (2022.01) |
| *G06V 20/62* | (2022.01) |
| *G06V 30/168* | (2022.01) |
| *G06F 18/241* | (2023.01) |
| *G06V 30/10* | (2022.01) |
| *G06V 30/16* | (2022.01) |

(52) U.S. Cl.
CPC .......... *G06V 20/62* (2022.01); *G06V 30/1473* (2022.01); *G06V 30/15* (2022.01); *G06V 30/153* (2022.01); *G06V 30/158* (2022.01); *G06V 30/168* (2022.01); *G06V 30/19173* (2022.01); *G06V 30/10* (2022.01); *G06V 30/1607* (2022.01)

(58) Field of Classification Search
CPC .. G06V 30/19173; G06V 30/10; G06V 30/15; G06V 30/158; G06V 30/1607; G06V 30/168; G06F 18/241
See application file for complete search history.

(56) References Cited

U.S. PATENT DOCUMENTS

| | | | |
|---|---|---|---|
| 2006/0294460 A1 * | 12/2006 | Chao | G06F 40/103 715/209 |
| 2020/0327384 A1 * | 10/2020 | Zhang | G06V 30/153 |

FOREIGN PATENT DOCUMENTS

| | | | | |
|---|---|---|---|---|
| CN | 110210478 A | | 9/2019 | |
| CN | 110555433 A | | 12/2019 | |
| WO | WO-2007011188 A1 * | 1/2007 | | G06K 9/03 |
| WO | WO-2019192397 A1 * | 10/2019 | | G06K 9/3233 |

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.
Baoguang Shi et al., An End-to-End Trainable Neural Network for Image-based Sequence Recognition and Its Application to Scene Text Recognition, arXiv: 1507.05717v1 [cs.CV] Jul. 21, 2015, 9 pages.
Xinyu Zhou et al., EAST: An Efficient and Accurate Scene Text Detector, arXiv:1704.03155v2 [cs.CV] Jul. 10, 2017, 10 pages.
Khalid Saeed et al, K3M: A Universal Algorithm for Image Skeletonization and a Review of Thinning Techniques, Int. J. Appl. Math. Comput. Sci., 2010, vol. 20, No. 2, 20 pages.
Wenhai Wang et al., Shape Robust Text Detection with Progressive Scale Expansion Network, arXiv:1903.12473v2 [cs.CV] Jul. 29, 2019, 13 pages.
Minghui Liao et al, TextBoxes: A Fast Text Detector with a Single Deep Neural Network, arXiv:1611.06779v1 [cs.CV] Nov. 21, 2016, 7 pages.
International Search Report and Written Opinion issued in PCT/2020/130217, dated Feb. 24, 2021, 8 pages.

* cited by examiner

Smoothed

TEXT RECOGNITION METHOD AND APPARATUS

CROSS-REFERENCE TO RELATED APPLICATIONS

This application is a continuation of International Application No. PCT/CN2020/130217, filed on Nov. 19, 2020, which claims priority to Chinese Patent Application No. 201911285619.0, filed on Dec. 13, 2019. The disclosures of the aforementioned applications are hereby incorporated by reference in their entireties.

TECHNICAL FIELD

This application relates to the field of information processing technologies, and in particular, to a text recognition method and apparatus.

BACKGROUND

Text information in natural scenarios is everywhere, for example, commodity packages, documents, store signs, road signs, and the like. Development of a deep learning (DL) technology leads to various text recognition algorithms based on a deep learning network.

For curved text, in a conventional technology, the curved text may be first detected by using a shape robust text detection with progressive scale expansion network algorithm, and then the curved text is recognized based on a detection result and a text recognition algorithm based on a deep learning network. However, a detection result of the shape robust text detection with progressive scale expansion network algorithm has low accuracy, and therefore recognition accuracy of the curved text is also low.

SUMMARY

This application provides a text recognition method and apparatus, to effectively resolve a low recognition rate of curved text.

To achieve the foregoing objective, this application provides the following technical solutions.

According to a first aspect, this application provides a text recognition method. A text recognition apparatus obtains a to-be-detected image, and determines a target text detection area in the to-be-detected image. The target text detection area includes target text in the to-be-detected image. The target text detection area is a polygonal area including m (m is a positive integer greater than 2) vertex pairs, and m vertices are located on one side of the target text, and other m vertices are located on another side of the target text. Then, the text recognition apparatus corrects the polygonal area to m−1 rectangular areas to obtain a corrected target text detection area, performs text recognition on the corrected target text detection area, and outputs the target text.

According to the text recognition method provided in this embodiment of this application, based on a pre-trained text detection network, the text recognition apparatus can accurately detect a curved target text area in the to-be-detected image, and determine the polygonal target text detection area. The polygonal target text detection area has the m vertex pairs. The text recognition apparatus corrects the obtained polygonal area to the m−1 rectangular areas to obtain the target text detection area, and performs text recognition on the target text detection area. Compared with the conventional technology, in the text recognition method provided in this embodiment of this application, a distortion rate of text is effectively reduced, and accuracy of recognizing curved text is improved.

With reference to the first aspect, in a possible design manner, the polygonal area is in a strip shape.

Each strip-shaped target text detection area includes one row of text, a height of the strip-shaped target text detection area is a height in a text height direction, and a length of the strip-shaped target text detection area is a length in a text width direction.

The strip-shaped polygonal area may be a horizontal strip-shaped polygonal area, a vertical strip-shaped polygonal area, or an oblique strip-shaped polygonal area. This is not limited in this embodiment of this application. The horizontal strip-shaped polygonal area means that the strip-shaped polygonal area extends in a horizontal direction, the vertical strip-shaped polygonal area means that the strip-shaped polygonal area extends in a vertical direction (relative to the horizontal direction), and the oblique strip-shaped polygonal area means that the strip-shaped polygonal area extends obliquely.

With reference to the first aspect, in another possible design manner, "obtaining a to-be-detected image" in the method includes: The text recognition apparatus obtains the to-be-detected image that is instantly photographed by a user, or selects the to-be-detected image from stored images.

In an actual application, the text recognition apparatus obtains the to-be-detected image in a plurality of manners. This is not limited in this application.

With reference to the first aspect, in another possible design manner, "determining a target text detection area in the to-be-detected image" in the method includes: The text recognition apparatus determines the target text detection area based on the to-be-detected image and a pre-trained text detection network.

The text recognition apparatus may obtain the target text detection area in the to-be-detected image by inputting the to-be-detected image into the pre-trained text detection network.

With reference to the first aspect, in another possible design manner, "determining the target text detection area based on the to-be-detected image and a pre-trained text detection network" in the method includes: The text recognition apparatus inputs the to-be-detected image into the text detection network to obtain an initial target text detection area; and perform smoothing processing on the initial target text detection area to obtain the target text detection area.

In an actual application, sawteeth may exist in the initial target text detection area output from the text detection network, and the sawteeth affect subsequent text recognition performed by the text recognition apparatus. Therefore, the text recognition apparatus performs smoothing processing on the initial target text detection area to eliminate the sawteeth.

With reference to the first aspect, in another possible design manner, the text recognition apparatus performs pre-training based on a training image of a marked text area to obtain the text detection network. The text area includes text in the training image.

With reference to the first aspect, in another possible design manner, "performing pre-training based on a training image of a marked text area to obtain the text detection network" in the method includes: The text recognition apparatus determines a segmentation label based on a preset segmentation label task algorithm and the training image, where the segmentation label indicates a center line of text in the training image; determines a regression label based on a preset regression label task algorithm, the determined segmentation label, and the training image, where the regression label indicates a plurality of vertex pairs, and a connection line between vertices in any one of the plurality of vertex pairs intersects the center line; and training the text detection network based on the determined segmentation label, the determined regression label, and the training image.

The text detection network is obtained by performing training on the training image based on the determined segmentation label, the determined regression label, and the training image. When text in the to-be-detected image needs to be recognized, the to-be-detected image is input into the text detection network, so that detection can be prepared and the target text detection area can be determined.

With reference to the first aspect, in another possible design manner, the foregoing "a connection line between vertices in any one of the plurality of vertex pairs intersects the center line" includes: an intersection point at which the connection line between the vertices in the vertex pair intersects the center line is a first intersection point, a value of an included angle between the connection line and a tangent line of the first intersection point is 90±A degrees, and A is less than or equal to 15.

The included angle between the connection line between the vertices in the vertex pair, and the tangent line of the first intersection point is 90±15 degrees. In this case, when the trained text detection network detects the to-be-detected image, the output target text detection area is more accurate.

With reference to the first aspect, in another possible design manner, "correcting the polygonal area to m−1 rectangular areas" in the method includes: The text recognition apparatus divides the polygonal area into m−1 quadrilateral areas that do not overlap each other, where any quadrilateral area is obtained based on two adjacent vertex pairs in the m vertex pairs. Vertices in each of the m vertex pairs are located on two sides of a center line of the target text detection area, a midpoint of a connection line between the vertices in the vertex pair is located on the center line, and the center line passes through all pieces of text in the target text detection area. The text recognition apparatus respectively corrects the m−1 quadrilateral areas that do not overlap each other to the m−1 rectangular areas.

The target text detection area includes a plurality of quadrilateral areas, and the text recognition apparatus corrects each quadrilateral area to a rectangular area. In this way, a distortion rate of text in a correction process is effectively reduced.

With reference to the first aspect, in another possible design manner, "obtaining a corrected target text detection area" in the method includes: The text recognition apparatus sequentially splices, in a horizontal direction, the m−1 rectangular areas obtained through correction to obtain a rectangular target text detection area, or sequentially splices, in a vertical direction, the m−1 rectangular areas obtained through correction to obtain a rectangular target text detection area.

The text recognition apparatus may determine, based on a shape of the target text detection area, to splice, in the horizontal direction or in the vertical direction, the m−1 rectangular areas obtained through correction. If the target text detection area is in a horizontal strip shape, the text recognition apparatus may splice, in the horizontal direction, the m−1 rectangular areas obtained through correction. If the target text detection area is in a vertical strip shape, the text recognition apparatus may splice, in the vertical direction, the m−1 rectangular areas obtained through correction. If the target text detection area is in an oblique strip shape, the text recognition apparatus may splice, in the horizontal direction or in the vertical direction according to a preset rule or based on a slope of the oblique strip shape, the m−1 rectangular areas obtained through correction. This is not limited in this embodiment of this application.

The text recognition apparatus obtains the rectangular target text detection area through splicing by using the foregoing method, to meet different scenario requirements.

With reference to the first aspect, in another possible design, "outputting the target text" in the method includes: The text recognition apparatus displays the target text in a preset area in the to-be-detected image.

In an actual application, the text recognition apparatus may display the target text in the preset area in the to-be-detected image according to a preset rule or based on a user requirement.

With reference to the first aspect, in another possible design manner, the text recognition apparatus further sends the target text to a client.

After receiving the target text, the client further displays the target text to the user.

In an actual application, the text recognition apparatus may be a server. When recognizing the target text in the to-be-detected image, the server sends the recognized target text to the client.

According to a second aspect, this application provides a text recognition apparatus. The text recognition apparatus includes an obtaining unit, a determining unit, a correction unit, a recognition unit, and an output unit.

The obtaining unit is configured to obtain a to-be-detected image. The determining unit is configured to determine a target text detection area in the to-be-detected image, where the target text detection area includes target text in the to-be-detected image, the target text detection area is a polygonal area, the polygonal area includes m vertex pairs, m is a positive integer greater than 2, m vertices are located on one side of the target text, and other m vertices are located on another side of the target text. The correction unit is configured to correct the polygonal area to m−1 rectangular areas to obtain a corrected target text detection area. The recognition unit is configured to perform text recognition on the corrected target text detection area. The output unit is configured to output the target text recognized by the recognition unit.

With reference to the second aspect, in a possible design manner, the polygonal area is in a strip shape.

With reference to the second aspect, in another possible design manner, the obtaining unit is specifically configured to: obtain the to-be-detected image that is instantly photographed by a user, or select the to-be-detected image from stored images.

With reference to the second aspect, in another possible design manner, the determining unit is specifically configured to determine the target text detection area based on the to-be-detected image and a pre-trained text detection network.

With reference to the second aspect, in another possible design manner, the determining unit is specifically configured to: input the to-be-detected image into the text detection network to obtain an initial target text detection area; and perform smoothing processing on the initial target text detection area to obtain the target text detection area.

With reference to the second aspect, in another possible design manner, the text recognition apparatus further includes a training unit.

The training unit is configured to perform pre-training based on a training image of a marked text area to obtain the text detection network. The text area includes text in the training image.

With reference to the second aspect, in another possible design manner, the determining unit is further configured to: determine a segmentation label based on a preset segmentation label task algorithm and the training image, where the segmentation label indicates a center line of text in the training image, and determine a regression label based on a preset regression label task algorithm, the training image, and the segmentation label determined by the determining unit, where the regression label indicates a plurality of vertex pairs, and a connection line between vertices in any one of the plurality of vertex pairs intersects the center line. The training unit is specifically configured to perform training based on the training image, and the segmentation label and the regression label that are determined by the determining unit to obtain the text detection network.

With reference to the second aspect, in another possible design manner, the foregoing "a connection line between vertices in any one of the plurality of vertex pairs intersects the center line" includes: an intersection point at which the connection line between the vertices in the vertex pair intersects the center line is a first intersection point, a value of an included angle between the connection line and a tangent line of the first intersection point is 90±A degrees, and A is less than or equal to 15.

With reference to the second aspect, in another possible design manner, the correction unit is specifically configured to:
divide the polygonal area into m−1 quadrilateral areas that do not overlap each other, where any quadrilateral area is obtained based on two adjacent vertex pairs in the m vertex pairs, vertices in each of the m vertex pairs are located on two sides of a center line of the target text detection area, a midpoint of a connection line between the vertices in the vertex pair is located on the center line, and the center line passes through all pieces of text in the target text detection area; and
respectively correct the m−1 quadrilateral areas that do not overlap each other to the m−1 rectangular areas.

With reference to the second aspect, in another possible design manner, the text recognition apparatus further includes a splicing unit.

The splicing unit is configured to: sequentially splice, in a horizontal direction, the m−1 rectangular areas obtained by the correction unit through correction to obtain a rectangular target text detection area, or sequentially splice, in a vertical direction, the m−1 rectangular areas obtained by the correction unit through correction to obtain a rectangular target text detection area.

With reference to the second aspect, in another possible design manner, the text recognition apparatus further includes a display unit.

The display unit is configured to display the target text that is in a preset area in the to-be-detected image and that is recognized by the recognition unit.

With reference to the second aspect, in another possible design manner, the text recognition apparatus further includes a sending unit.

The sending unit is configured to send the target text to a client.

According to a third aspect, this application provides a text recognition apparatus. The text recognition apparatus includes a memory and one or more processors. The memory is coupled to the processor, and the memory is configured to store computer program code. The computer program code includes computer instructions, and when the computer instructions are executed by the text recognition apparatus, the text recognition apparatus is enabled to perform the text recognition method according to any one of the first aspect and the possible design manners of the first aspect.

According to a fourth aspect, this application provides a chip system. The chip system is applied to a text recognition apparatus, and the chip system includes one or more interface circuits and one or more processors. The interface circuit and the processor are interconnected by using a line, and the interface circuit is configured to: receive a signal from a memory of the text recognition apparatus, and send the signal to the processor. The signal includes computer instructions stored in the memory, and when the processor executes the computer instructions, the text recognition apparatus performs the text recognition method according to any one of the first aspect and the possible design manners of the first aspect.

According to a fifth aspect, this application provides a computer-readable storage medium. The computer-readable storage medium includes computer instructions, and when the computer instructions are run on a text recognition apparatus, the text recognition apparatus is enabled to implement the text recognition method according to any one of the first aspect and the possible design manners of the first aspect.

According to a sixth aspect, this application provides a computer program product. When the computer program product runs on a computer, the computer is enabled to perform the text recognition method according to any one of the first aspect and the possible design manners of the first aspect.

For detailed description of the second aspect to the sixth aspect and the implementations of the second aspect to the sixth aspect in this application, refer to the detailed description of the first aspect and the implementations of the first aspect. In addition, for beneficial effects of the second aspect to the sixth aspect and the implementations of the second aspect to the sixth aspect, refer to beneficial effect analysis of the first aspect and the implementations of the first aspect. Details are not described herein again.

In this application, a name of the text recognition apparatus does not constitute a limitation on devices or function modules. In an actual implementation, these devices or function modules may appear with other names, provided that functions of the devices or the function modules are similar to those in this application and fall within the scope of the claims of this application and their equivalent technologies.

These aspects or other aspects of this application are more readily understood in the following description.

DESCRIPTION OF EMBODIMENTS

Figure 1A:
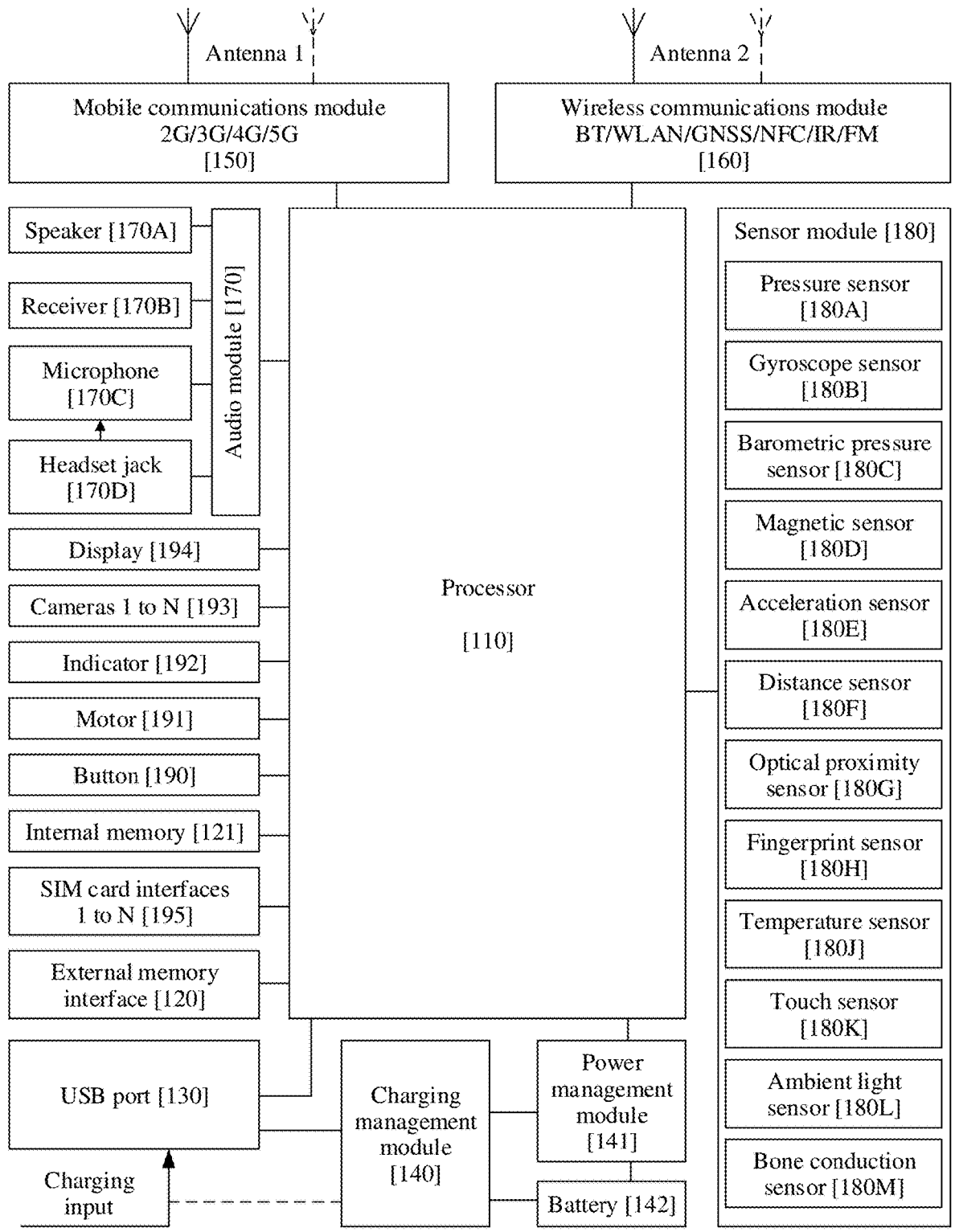
FIG. 1a is a schematic diagram of a hardware structure of a text recognition apparatus according to an embodiment of this application.

In embodiments of this application, a word such as "example" or "for example" is used for representing an example, an example illustration, or description. Any embodiment or design solution described as "example" or "for example" in embodiments of this application is not to be construed as being more preferred or advantageous than other embodiments or design solutions. Exactly, use of the word such as "example" or "for example" is intended to present a related concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the description of embodiments of this application, "a plurality of" means two or more than two unless otherwise specified.

Embodiments of this application provide a text recognition method and apparatus. After receiving a to-be-detected image, the text recognition apparatus accurately detects a target text detection area (the target text detection area includes target text in the to-be-detected image) based on a pre-trained text detection network. The target text detection area is a polygonal area, the polygonal area includes m vertex pairs, and m is a positive integer greater than 2. Then, the text recognition apparatus corrects the polygonal area to m−1 rectangular areas, and splices the m−1 rectangular areas in a horizontal direction or a vertical direction to obtain a corrected target text detection area. Finally, the text recognition apparatus inputs the corrected target text detection area into a text recognition algorithm to obtain a text recognition result. Compared with a conventional technology, in the text recognition method provided in this embodiment of this application, accuracy of recognizing curved text is effectively improved.

The text recognition apparatus may be a terminal. Specifically, the terminal may be a portable device such as a mobile phone, a tablet computer, or a wearable electronic device, may be a computing device such as a personal computer (PC), a personal digital assistant (PDA), or a netbook, or may be any other terminal device that can implement embodiments of this application. This is not limited in this application.

Certainly, the text recognition apparatus may alternatively be a server.

When the text recognition apparatus is a terminal, the text recognition method may be implemented by using an application program installed on the terminal, for example, a client application program, a browser, or the like of the text recognition apparatus.

The application program may be an embedded application program installed in a device (namely, a system application of the device), or may be a downloadable application program. The embedded application program is an application program provided as a part of an implementation of the device (for example, a mobile phone). The downloadable application program is an application program that can provide an Internet protocol multimedia subsystem (IMS) connection of the application program, and the downloadable application program is an application that can be pre-installed in the device or a third-party application that can be downloaded by a user and installed in the device.

Refer to FIG. 1a, an example in which the text recognition apparatus is a mobile phone is used. FIG. 1a shows a hardware structure of the mobile phone 10. As shown in FIG. 1a, the mobile phone 10 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the mobile phone 10. In some other embodiments of this application, the mobile phone 10 may include more or fewer components than those shown in the figure, some components may be combined, some components may be split, or there may be a different component layout. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone 10. The controller may generate an operation control signal based on instruction operation code and a time sequence signal, to complete control of instruction reading and instruction execution.

The memory may be further disposed in the processor 110, to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and therefore, improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). The I2S interface may be used for audio communication. The PCM interface may also be used for audio communication, to sample, quantize, and encode an analog signal. The UART interface is a universal serial data bus used for asynchronous communication. The bus may be a bidirectional communications bus. The bus converts to-be-transmitted data between serial communication and parallel communication. The MIPI interface may be configured to connect the processor 110 to a peripheral component such as the display 194 or the camera 193. The MIPI interface includes a camera serial interface (CSI), a display serial interface (DSI), or the like. The GPIO interface may be configured by using software. The GPIO interface may be configured as a control signal or a data signal. The USB port 130 is a port that conforms to a USB standard specification, and may be specifically a mini USB port, a micro USB port, a USB Type-C port, or the like. The USB port 130 may be configured to connect to a charger to charge the mobile phone 10, or may be configured to transmit data between the mobile phone 10 and a peripheral device. The USB port 130 may alternatively be configured to connect to a headset, to play audio by using the headset. The interface may be further configured to connect to another electronic device, for example, an AR device.

It may be understood that an interface connection relationship between modules illustrated in this embodiment of this application is merely an example for description, and does not constitute a limitation on the structure of the mobile phone 10. In some other embodiments of this application, the mobile phone 10 may alternatively use an interface connection mode different from that in the foregoing embodiment, or a combination of a plurality of interface connection modes.

The charging management module 140 is configured to receive a charging input from the charger. The charger may be a wireless charger or a wired charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery state of health (leakage and impedance).

A wireless communications function of the mobile phone 10 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone 10 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communications solution that includes 2G/3G/4G/5G or the like and that is applied to the mobile phone 10. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device. The modem processor may include a modulator and a demodulator.

The wireless communications module 160 may provide a wireless communications solution that includes a wireless local area network (WLAN) (for example, a wireless fidelity (Wi-Fi) network), Bluetooth (BT), a GNSS, frequency modulation (FM), a near field communications (NFC) technology, an infrared (IR) technology, or the like and that is applied to the mobile phone 10. The wireless communications module 160 may be one or more components that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

For example, the GNSS in this embodiment of this application may include a GPS, a GLONASS, a BDS, a QZSS, an SBAS, and/or a Galileo system.

The mobile phone 10 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute program instructions to generate or change display information. The display 194 is configured to display an image, a video, and the like. The display 194 includes a display panel.

The mobile phone 10 can implement a photographing function by using the ISP, the camera 193, the video codec, the GPU, the display 194, the application processor, and the like. The ISP is configured to process data fed back by the camera 193. The camera 193 is configured to capture a static image or a video. An optical image of an object is generated through a lens, and is projected to a photosensitive element. The digital signal processor is configured to process a digital signal, and may process another digital signal in addition to a digital image signal. The video codec is configured to: compress or decompress a digital video.

The NPU is a neural-network (NN) computing processor. The NPU quickly processes input information by referring to a biological neural network structure, for example, by referring to a mode of transfer between human brain neurons, and may further continuously perform self-learning. Applications such as intelligent cognition of the mobile phone 10, such as image recognition, facial recognition, speech recognition, and text understanding, can be implemented by using the NPU.

The external memory interface 120 may be configured to connect to an external storage card, for example, a micro SD card, to extend a storage capability of the mobile phone 10. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the mobile phone 10 and data processing.

The mobile phone 10 can implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for outputting, and is also configured to convert an analog audio input into a digital audio signal. The speaker 170A, also referred to as a "loudspeaker", is configured to convert an audio electrical signal into a sound signal. The receiver 170B, also referred to as an "earpiece", is configured to convert an electrical audio signal into a sound signal. The microphone 170C, also referred to as "mike" or "mic", is configured to convert a sound signal into an electrical signal. The headset jack 170D is configured to connect to a wired headset. The headset jack 170D may be the USB port 130, or may be a 3.5 mm open mobile terminal platform (OMTP) standard interface, or a cellular telecommunications industry association of the USA (CTIA) standard interface.

The button 190 includes a power button, a volume button, and the like. The button 190 may be a mechanical button, or may be a touch button. The mobile phone 10 may receive a button input, and generate a button signal input related to a user setting and function control of the mobile phone 10. The motor 191 may generate a vibration prompt. The motor 191 may be used for an incoming call vibration prompt, or may be used for a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or detached from the SIM card interface 195, to implement contact with or separation from the mobile phone 10. The mobile phone 10 may support one or N SIM card interfaces, where N is a positive integer greater than 1. The SIM card interface 195 may support a nano-SIM card, a micro-SIM card, a SIM card, and the like.

A software system of the mobile phone 10 may use a layered architecture, an event-driven architecture, a microkernel architecture, a microservice-based architecture, or a cloud architecture. In this embodiment of this application, an Android system with the layered architecture is used as an example to describe a software structure of the mobile phone 10.

Figure 1B:
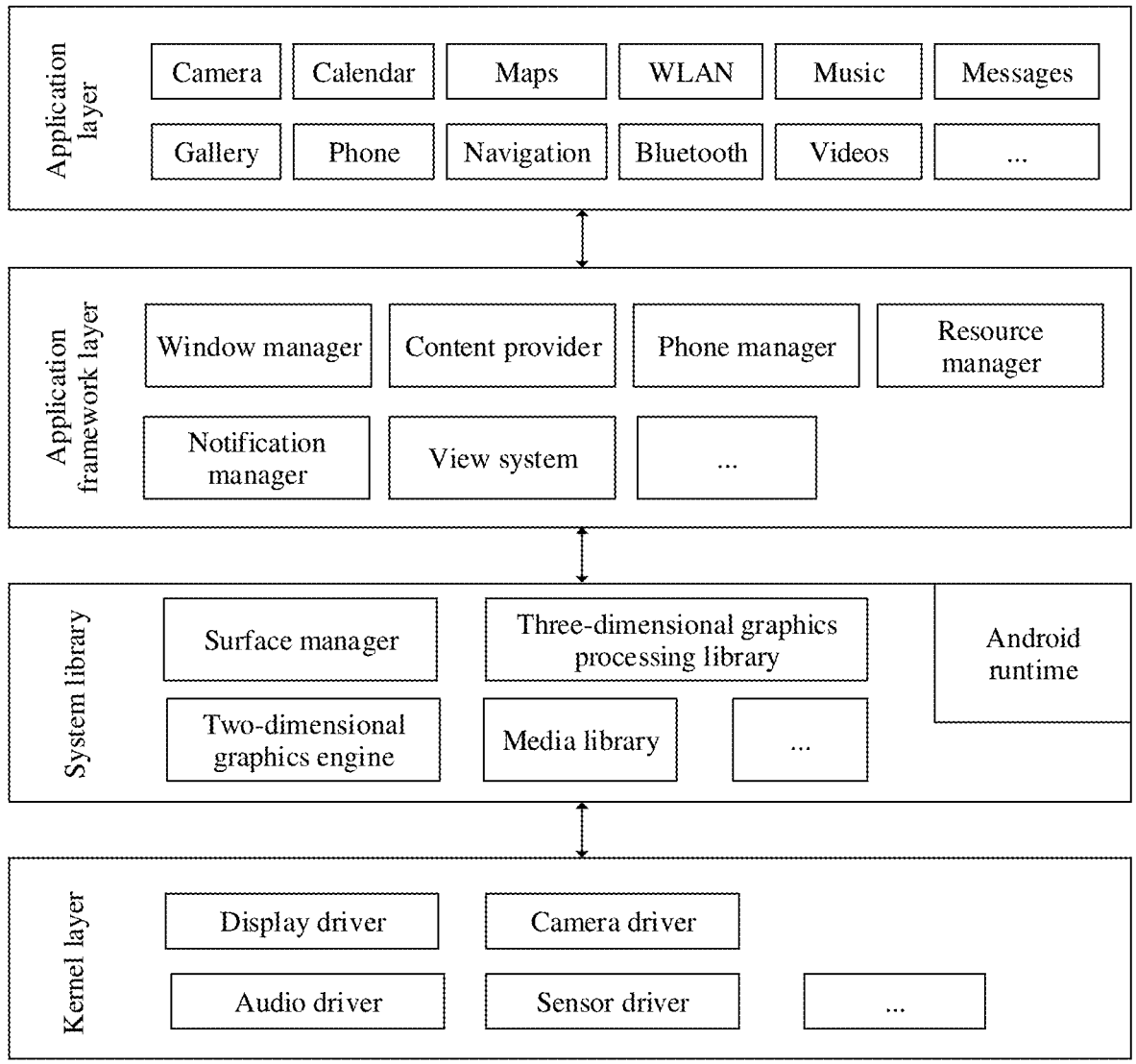
FIG. 1B is a schematic diagram of a software structure of a text recognition apparatus according to an embodiment of this application.

FIG. 1B is a block diagram of a software structure of the mobile phone 10 according to an embodiment of this application.

In a layered architecture, software is divided into several layers, and each layer has a clear role and task. Layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 1B, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to store and obtain data, and enable the data to be accessed by an application. The data may include a video, an image, an audio, calls that are made and answered, a browsing history and bookmarks, an address book, and the like.

The view system includes visual controls such as a control for displaying text and a control for displaying an image. The view system may be configured to construct an application. A display interface may include one or more views. For example, a display interface including a notification icon of Messages may include a text display view and an image display view.

The phone manager is configured to provide a communications function of the mobile phone 10, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification-type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on the background or a notification that appears on the screen in a form of a dialog window. For example, text information is displayed in the status bar, an announcement is given, an electronic device vibrates, the indicator light blinks, and the like.

The Android runtime includes a kernel library and a virtual machine. The Android runtime is responsible for scheduling and management of the Android system.

The kernel library includes two parts: a function that needs to be invoked by the Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, such as a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the mobile phone 10 by using an example with reference to a photographing capture scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. The camera application invokes an interface of the application framework layer to enable the camera application, then enables the camera driver by invoking the kernel layer, and captures a static image or a video through the camera 193.

The following describes the text recognition method provided in embodiments of this application with reference to the accompanying drawings.

It can be learned from the foregoing description that, in the text recognition method provided in embodiments of this application, the text recognition apparatus inputs the to-be-detected image into the pre-trained text detection network, to accurately detect the target text detection area. The following first describes the pre-trained text detection network.

The pre-trained text detection network may be a pre-trained convolutional neural network (CNN). In this embodiment of this application, an example in which the text recognition apparatus pre-trains the text detection network is used for description.

Figure 2:
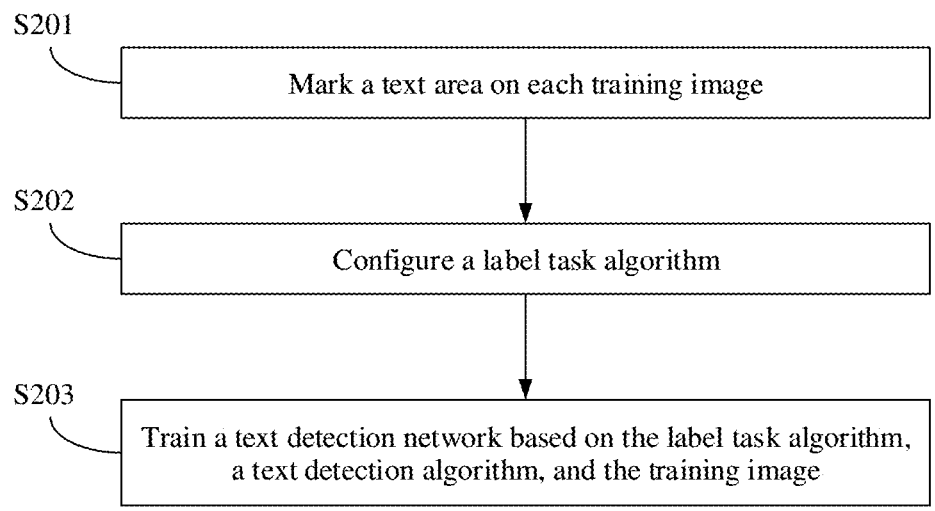
FIG. 2 is a schematic flowchart 1 of a text recognition method according to an embodiment of this application.

FIG. 2 is a schematic flowchart of training a text detection network by a text recognition apparatus. A process of training the text detection network by the text recognition apparatus may include the following steps.

S201: The text recognition apparatus marks a text area on each training image.

Specifically, the text recognition apparatus marks the text area on each training image. Text in the training image may include curved text, tilted text, or text of any other shape. This is not limited in this embodiment of this application.

The marked text area on the training image may be a single-line text area. In other words, one text area includes only one line of text.

Figure 3:
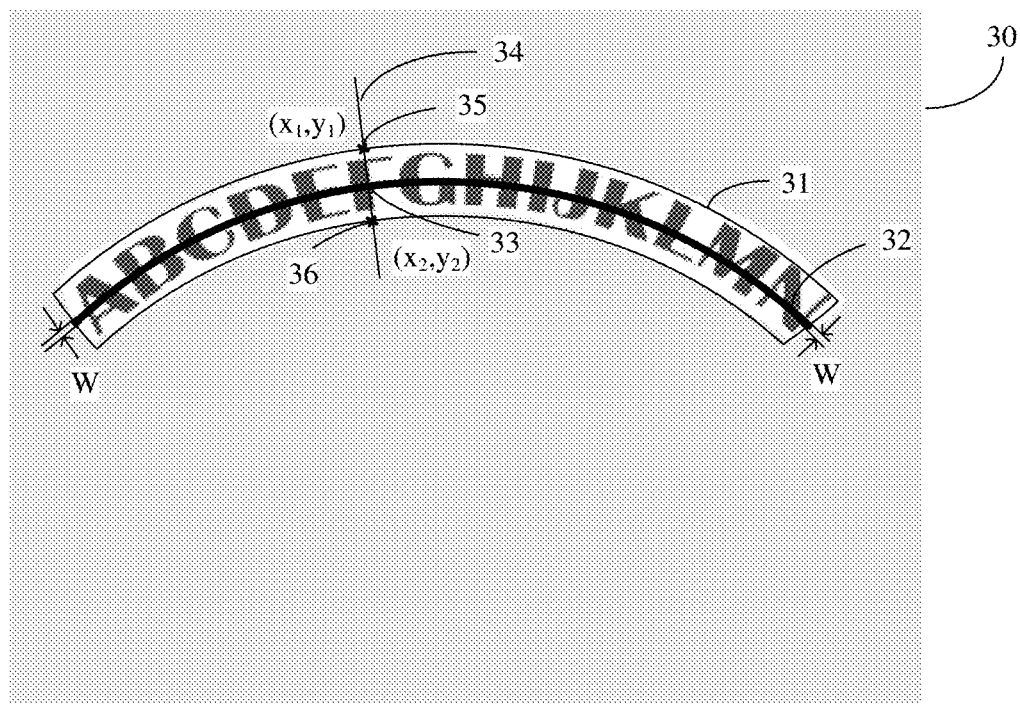
FIG. 3 is a schematic diagram 1 of a text recognition method according to an embodiment of this application.

For example, as shown in FIG. 3, the text recognition apparatus marks a text area 31 on a training image 30. The text area 31 indicates a location of text in the training image 30.

S202: The text recognition apparatus configures a label task algorithm.

The label task algorithm may be pre-designed by a developer and configured on the text recognition apparatus. The label task algorithm includes a segmentation label task algorithm and a regression label task algorithm.

Figure 4A:
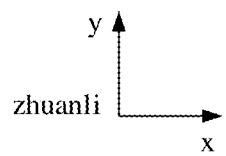
FIG. 4(a) and FIG. 4(b) are a schematic diagram 2 of a text recognition method according to an embodiment of this application.
Figure 4B:
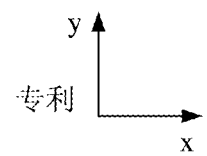

The segmentation label task algorithm is used to calculate a center line of the text area based on a range of the text area. The center line may be a line, in the text area, formed by center points in a text height direction. For example, as shown in FIG. 4(a), a center point of alphabetic text "zhuanli" (patent in English) in the text height direction is a center point of the alphabetic text in a y-axis direction. As shown in FIG. 4(b), a center point of Chinese text "专利" in the text height direction is a center point of the Chinese text in the y-axis direction. Herein, an x-axis direction shown in FIG. 4(a) and in FIG. 4(b) may be along a horizontal width direction of the text. For example, the horizontal width direction may be a direction from the letter "z" to the letter "i" in FIG. 4(a).

The foregoing limitation on the text height direction is merely an example for description. In an actual application, a person skilled in the art should understand that, after the text is rotated by an angle, the coordinate axis in FIG. 4(a) and FIG. 4(b) may also be rotated by the same angle as the text.

The center line may be a pixel-level label. A width of the center line is less than a width of the text area. Specifically, the width of the center line may be 0.1 to 1 times the width of the text area. For example, the width of the center line is 0.2 times a width of a text area box.

For example, as shown in FIG. 3, the text recognition apparatus obtains, through calculation based on the range of the text area 31 by using the segmentation label task algorithm, that a black bold line 32 is the center line of the text area 31 in the text height direction, and a width W of the black bold line 32 is 0.2 times the width of the text area 31.

The regression label task algorithm is used to determine a pair of intersection points (in this embodiment of this application, the intersection point is referred to as a vertex, and the pair of intersection points is referred to as a vertex pair) between a boundary of the text area and a straight line that passes through each center point on the center line. An included angle between the straight line and a tangent line of the point on the center line may be 90±A degrees, and A is less than or equal to 15.

For example, as shown in FIG. 3, the text recognition apparatus determines, by using the regression label task algorithm, two intersection points at which the straight line 34 that passes through the center point 33 on the center line 32 intersects the boundary of the text area 31: a vertex 35 (for example, $(x_1, y_1)$) and a vertex 36 (for example, $(x_2, y_2)$). An included angle between a tangent line of the center point 33 on the center line 32 and the straight line 34 may be 90 degrees.

It may be understood that each center point on the center line corresponds to one vertex pair. The vertex pair is two points on the boundary of the text area. If all vertices on one side of the center line are connected in sequence, one boundary of the text area may be obtained. If all vertices on the other side of the center line are connected in sequence, the other boundary of the text area may be obtained. When two boundaries are connected, the foregoing text area may be obtained.

Certainly, a segmentation label and a regression label of the training image may be obtained through calculation by using the pre-marked text area on the training image and the label task algorithm, or may be obtained by using the method for marking the text area in the training image in S201, that is, the segmentation label and the regression label are marked on the training image by using the text recognition apparatus. This is not limited in this embodiment of this application.

S203: The text recognition apparatus trains the text detection network based on the label task algorithm, a text detection algorithm, and the training image.

The text detection algorithm is a to-be-trained text detection network, and the text detection algorithm is used to detect the center line of the text area in the image and detect a vertex pair corresponding to each point on the center line.

Specifically, the text recognition apparatus may input one training image into the label task algorithm and the text detection algorithm each time, to train the text detection network. The text recognition apparatus may further input a group of training images into the label task algorithm and the text detection algorithm each time, to train the text detection network. This is not limited in this embodiment of this application.

The label task algorithm includes the segmentation label task algorithm and the regression label task algorithm.

For example, the training method for the text detection network described below in this embodiment of this application is described by using an example in which a group of training images are input into the label task algorithm and the text detection algorithm each time to train the text detection network.

Specifically, the text recognition apparatus inputs a training image group 1 marked with the text area box into the segmentation label task algorithm to obtain a center line of a text area in each training image in the training image group 1. The training image group 1 includes n training images (for example, a training image 1, a training image 2, . . . , and a training image n), and n is a positive integer. Then, the text recognition apparatus inputs a calculated center line of each training image in the training image group 1 and a training image corresponding to the center line into the regression label task algorithm, to determine a vertex pair corresponding to each point on the center line.

The text recognition apparatus further inputs the training image group 1 into the text detection algorithm, to detect the center line of the text area in each training image in the training image group 1 and the vertex pair corresponding to each point on the center line.

The text recognition apparatus may simultaneously perform "calculating the center line and the vertex pair of the text area in each training image in the training image group 1 by using the label task algorithm" and "detecting the center line and the vertex pair of the text area in each training image in the training image group 1 by using the text detection algorithm". Alternatively, the text recognition apparatus may first perform "calculating the center line and the vertex pair of the text area in each training image in the training image group 1 by using the label task algorithm", and then perform "detecting the center line and the vertex pair of the text area in each training image in the training image group 1 by using the text detection algorithm". Alternatively, the text recognition apparatus may first perform "detecting the center line and the vertex pair of the text area in each training image in the training image group 1 by using the text detection algorithm", and then perform "calculating the center line and the vertex pair of the text area in each training image in the training image group 1 by using the label task algorithm". This is not limited in this embodiment of this application.

Further, the text recognition apparatus performs an operation 1:

The text recognition apparatus determines, by using a loss function and based on a result that is of the training image 1 and that is calculated by using the label task algorithm and a result that is of the training image 1 and that is detected by using the text detection algorithm, a difference 1 between the calculated result and the detected result. The text recognition apparatus determines, by using a loss function and based on a result that is of the training image 2 and that is calculated by using the label task algorithm and a result that is of the training image 2 and that is detected by using the text detection algorithm, a difference 2 between the calculated result and the detected result. Similarly, after determining, by using the loss function and based on a result that is of the training image n and that is calculated by using the label task algorithm and a result that is of the training image n and that is detected by using the text detection algorithm, a difference n between the calculated result and the detected result, the text recognition apparatus obtains, based on the determined difference 1, difference 2, . . . , and difference n, an average difference of the n differences. If the average difference is greater than a first threshold, it indicates that a detection result of the text detection algorithm does not meet an expected result (the expected result means that the text recognition apparatus can accurately detect the text area in the image by using the text detection algorithm). In this case, the text recognition apparatus adjusts a parameter of the text detection algorithm. The first threshold may be set based on an actual situation. This is not specifically limited in this embodiment of this application.

Certainly, the text recognition apparatus may separately determine the n differences by using the loss function, or may simultaneously determine the n differences by using the loss function. This is not limited in this embodiment of this application.

Then, the text recognition apparatus inputs a training image group 2 marked with the text area box into the label task algorithm and the text detection algorithm, and repeatedly performs the operation 1 until an average difference between a calculation result and a detection result is less than the first threshold, or until a quantity of repetition times of the operation 1 reaches a preset threshold. The preset threshold may be set based on an actual situation. This is not specifically limited in this embodiment of this application.

It can be learned that a training process of the text detection network in this embodiment of this application is a cyclic iteration process. The text detection network trained by using the foregoing process is stable, and can accurately detect a target text detection area in a to-be-detected image.

After training of the text detection network is completed, feature maps of five channels may be output from the to-be-detected image by using the text detection network.

A feature map of one channel indicates a center line. The center line includes i pixels, and is represented by confidence levels (in this embodiment of this application, z indicates the confidence level) of the i pixels. The confidence level z may be any value between 0 and 1. The confidence level z indicates whether a pixel is a center point in the text area in the text height direction.

For example, if the confidence level z of a pixel $i_n$ is 0, it indicates that the pixel $i_n$ is not the center point in the text height direction. If the confidence level z of the pixel $i_n$ is 0.2, it indicates that there is a high probability that the pixel $i_n$ is not the center point in the text height direction. If the confidence level z of the pixel $i_n$ is 1, it indicates that the pixel $i_n$ is the center point in the text height direction. If the confidence level z of the pixel $i_n$ is 0.8, it indicates that there is a high probability that the pixel $i_n$ is the center point in the text height direction. $i_n$ indicates any point in the feature map of the center line, and n is a positive integer.

The feature maps of the other four channels indicate coordinates of two vertices on a straight line that passes through a point on the center line and that has an included angle of 90±A degrees with a tangent line of the point. The two vertices are a vertex pair corresponding to the point.

It should be noted that a same point in the output feature map describes the center point and location information of the two vertices (namely, the vertex pair corresponding to the center point) on the straight line that passes through the center point. The location information may be absolute location information, or may be relative location information relative to the center point.

Figure 5:
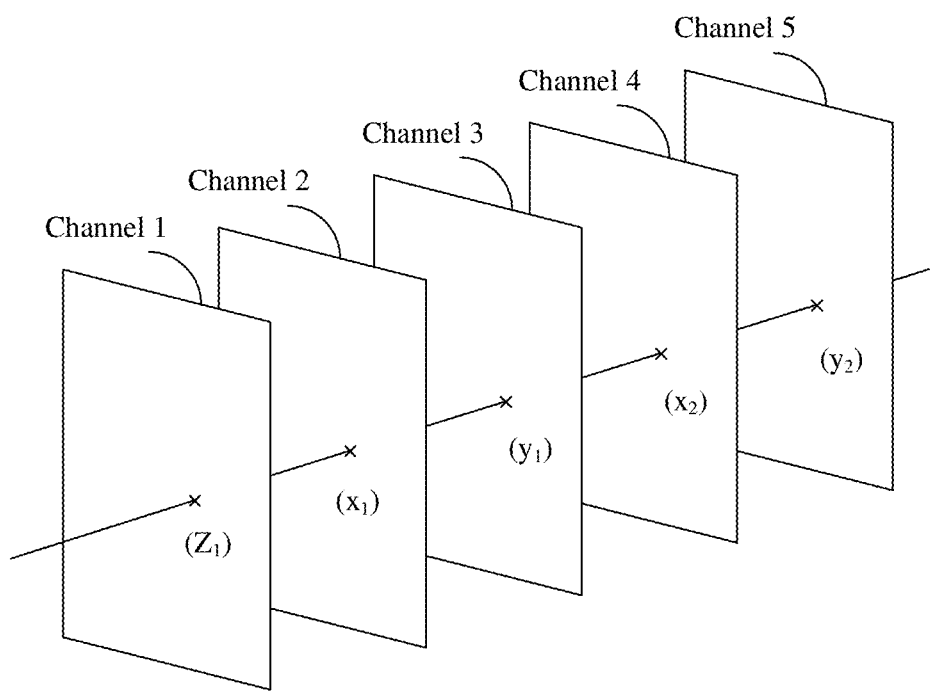
FIG. 5 is a schematic diagram 3 of a text recognition method according to an embodiment of this application.

For example, with reference to FIG. 3, refer to FIG. 5. If the to-be-detected image is the image 30, as shown in FIG. 5, the feature maps, of the five channels, including the center point 33 and the vertex pair (the vertex 35 ($x_1$, $y_1$) and the vertex 36 ($x_2$, $y_2$)) corresponding to the center point 33 are output from the to-be-detected image 30 by using the trained text detection network. The confidence level z of the center point 33 is $z_1$, and location information ($x_1$, $y_1$) and ($x_2$, $y_2$) of the vertex pair may be absolute coordinates ($x_1$, $y_1$) and ($x_2$, $y_2$), and may alternatively be relative coordinates ($x_1$, $y_1$) and ($x_2$, $y_2$) relative to the center point 33.

As shown in FIG. 5, a channel 1 indicates the confidence level $z_1$ of the center point 33, a channel 2 indicates an x-axis coordinate $x_1$ of the vertex 35, a channel 3 indicates a y-axis coordinate $y_1$ of the vertex 35, a channel 4 indicates an x-axis coordinate $x_2$ of the vertex 36, and the channel 5 indicates a y-axis coordinate $y_2$ of the vertex 36.

The text detection network trained in advance is disposed on the text recognition apparatus, so that the text recognition method provided in embodiments of this application can be implemented. The following describes the text recognition method.

Figure 6:
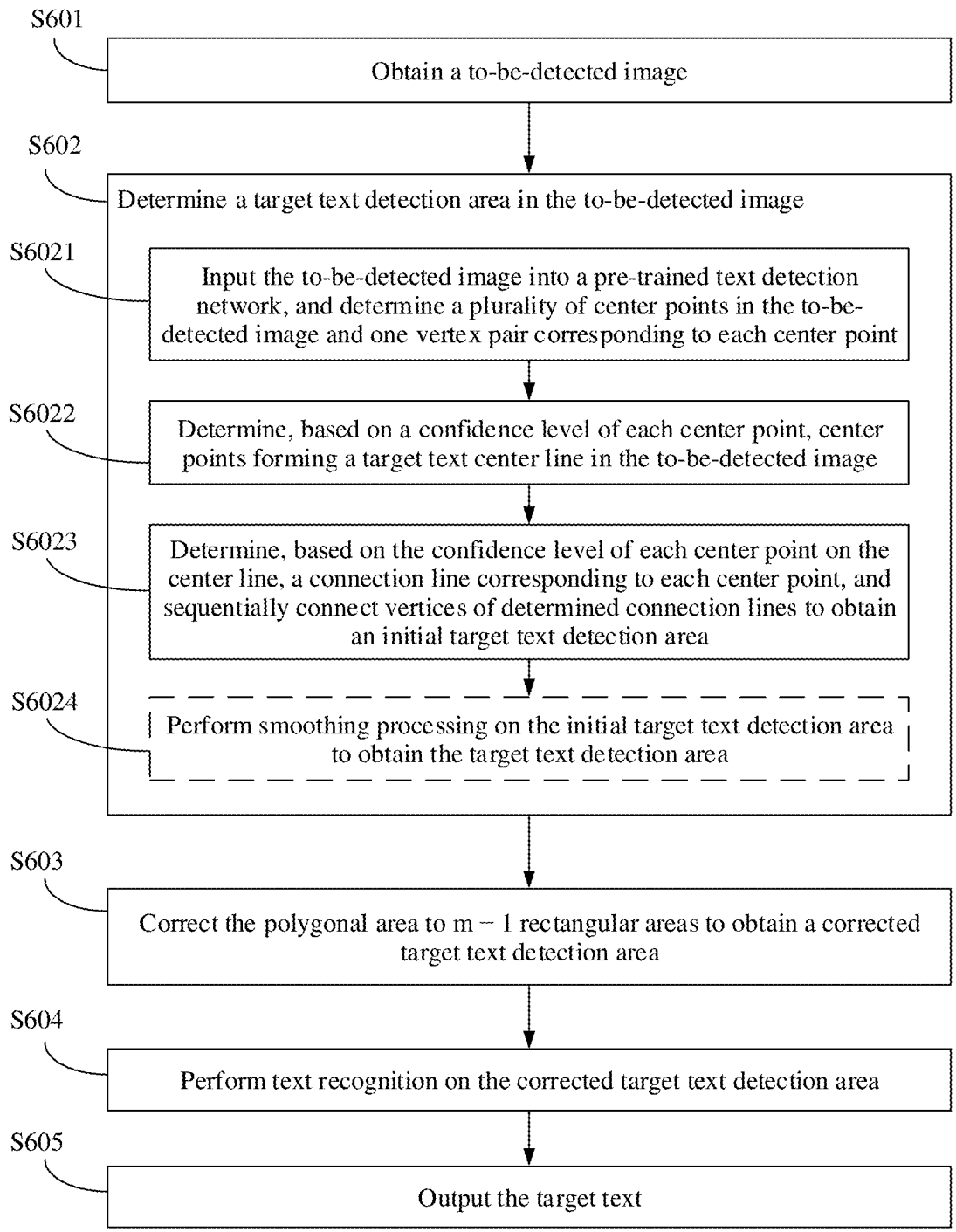
FIG. 6 is a schematic flowchart 2 of a text recognition method according to an embodiment of this application.

FIG. 6 is a schematic flowchart of a text recognition method according to an embodiment of this application. The text recognition method may include the following steps.

S601: A text recognition apparatus obtains a to-be-detected image.

Optionally, a user may select and load the to-be-detected image from an image library by operating an image loading icon of the text recognition apparatus. Correspondingly, the text recognition apparatus obtains the to-be-detected image. Images in the image library include an image obtained through photographing, an image downloaded from a network, an image transmitted through Bluetooth, an image sent by social software, a video screenshot in a video, and the like.

Optionally, the user may also photograph the to-be-detected image in real time by operating an image shooting icon of the text recognition apparatus, and then load the image. Correspondingly, the text recognition apparatus obtains the to-be-detected image.

S602: The text recognition apparatus determines a target text detection area in the to-be-detected image.

Specifically, the text recognition apparatus may determine the target text detection area in the to-be-detected image by using a trained text detection network. The text detection network is obtained through pre-training in the foregoing steps S201 to S203. Details are not described herein again.

The text recognition apparatus determines the target text detection area based on the pre-trained text detection network and the to-be-detected image. The target text detection area indicates a location of target text in the to-be-detected image, and the target text may be curved text or tilted text.

For example, as shown in FIG. 3, the image 30 may be the to-be-detected image. The image 30 includes text "ABCDEFGHIJKLMN", the text is target text in the to-be-detected image 30, and a shape of text distribution is a fan-shaped curve.

A process in which the text recognition apparatus determines the target text detection area based on the pre-trained text detection network and the to-be-detected image may include the following steps S6021 to S6024.

S6021: The text recognition apparatus inputs the to-be-detected image into the pre-trained text detection network, and determines a plurality of center points in the to-be-detected image and one vertex pair corresponding to each center point.

Specifically, after inputting the to-be-detected image into the pre-trained text detection network, the text recognition apparatus outputs feature maps of five channels. The text recognition apparatus determines, based on the feature maps of the five channels, the plurality of center points in the to-be-detected image, and determines the vertex pair corresponding to each center point.

S6022: The text recognition apparatus determines, based on a confidence level of each center point, center points forming a target text center line in the to-be-detected image.

Optionally, the text recognition apparatus may determine, based on the confidence level of each center point, that center points whose confidence levels are greater than a second threshold and that are adjacent to each other are the center points forming the target text center line in the to-be-detected image.

Optionally, the text recognition apparatus may further determine, based on the confidence level of each center point, that center points whose confidence levels are greater than the second threshold and in which a distance between each two center points is less than a first preset threshold are the center points forming the target text center line in the to-be-detected image.

If the confidence level determined by the text recognition apparatus is greater than the second threshold and a quantity of adjacent center points is less than a third preset threshold, or if the confidence level determined by the text recognition apparatus is greater than the second threshold and a quantity of center points in which the distance between each two center points is less than the first preset threshold is less than the third preset threshold, the text recognition apparatus invalidates or discards the center points.

The second threshold, the first preset threshold, and the third preset threshold may be set based on an actual situation. This is not limited in this embodiment of this application.

It may be understood that if the text recognition apparatus connects the determined center points forming the target text center line in the to-be-detected image, a curve with a specific width may be obtained. In this embodiment of this application, the curve is referred to as the center line.

S6023: The text recognition apparatus determines, based on the confidence level of each center point on the center line, a connection line corresponding to each center point, and sequentially connects vertices of determined connection lines to obtain an initial target text detection area.

The initial target text detection area includes m vertex pairs.

Specifically, in this embodiment of this application, the initial target text detection area may be obtained in any one of the following manner 1 to manner 4.

Manner 1: The text recognition apparatus may connect the vertex pair that corresponds to each center point and that is determined in S6022 to obtain the connection line corresponding to the center point. The text recognition apparatus sequentially connects the vertices of the connection lines corresponding to obtained center points, to obtain the initial target text detection area.

Figure 7:
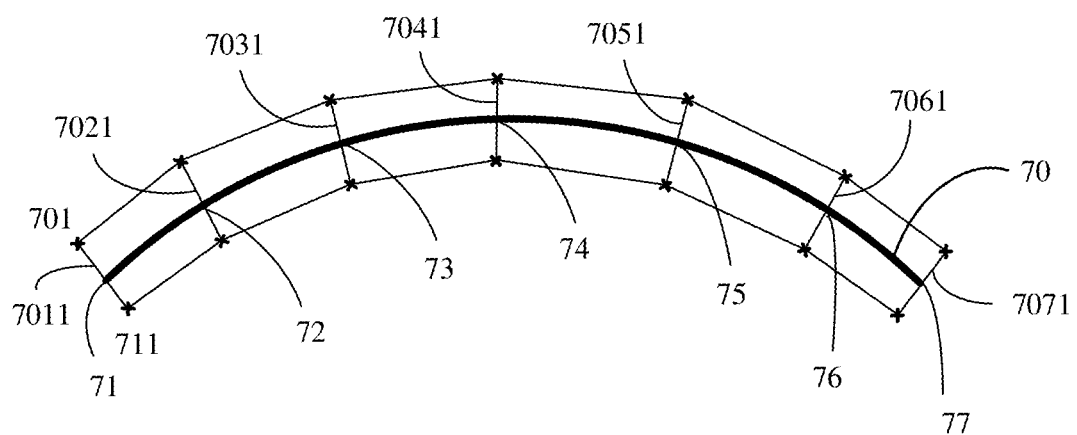
FIG. 7 is a schematic diagram 4 of a text recognition method according to an embodiment of this application.

For example, as shown in FIG. 7, the text recognition apparatus determines that the center line is a black bold line 70. The center line 70 includes center points 71, 72, 73, 74, 75, 76, and 77, and confidence levels of the center points 71, 72, 73, 74, 75, 76, and 77 are higher than the second threshold. Therefore, the text recognition apparatus connects a vertex pair (for example, a vertex 701 and a vertex 711) corresponding to the center point 71 to obtain a connection line 7011. Similarly, the text recognition apparatus obtains a connection line 7021 corresponding to the center point 72, a connection line 7031 corresponding to the center point 73, a connection line 7041 corresponding to the center point 74, a connection line 7051 corresponding to the center point 75, a connection line 7061 corresponding to the center point 76, and a connection line 7071 corresponding to the center point 77. Then, the text recognition apparatus sequentially connects vertices of the connection lines 7011, 7021, 7031, 7041, 7051, 7061 and 7071 to obtain the initial target text detection area.

Manner 2: The text recognition apparatus may perform, at intervals, sampling on the center points determined in S6022 to obtain m center points, where a distance between every two center points of the m center points is greater than or equal to the second preset threshold. Then, the text recognition apparatus connects a vertex pair corresponding to each of the m center points obtained through sampling, to obtain a connection line corresponding to the center point. The text recognition apparatus sequentially connects vertices of connection lines corresponding to the obtained center points, to obtain the initial target text detection area.

A specific process of that the text recognition apparatus performs, at intervals, sampling on the center points determined in S6022 to obtain m center points, where a distance between every two center points of the m center points is greater than or equal to the second preset threshold may be implemented in the following manners.

The text recognition apparatus sorts the center points determined in S6022 in descending order of confidence levels. Then, the text recognition apparatus may determine a center point with a highest confidence level as a center point 1. The text recognition apparatus determines a distance 1 between a center point with a second highest confidence level and the center point 1. If the distance 1 is greater than or equal to a second preset distance, the text recognition apparatus may determine the center point with the second highest confidence level as a center point 2 (If the distance 1 is less than the second preset distance, the center point with the second highest confidence level is discarded). Then, the text recognition apparatus may determine a distance 3 between a center point whose confidence level order is 3 and the center point 1, determine a distance 4 between the center point whose confidence level order is 3 and the center point 2, and if both of the distance 3 and the distance 4 are greater than or equal to the second preset threshold, determine that the center point whose confidence level order is 3 is a center point 3 (If the distance 3 is less than the second preset threshold, the distance 4 is less than the second preset threshold, or both of the distance 3 and the distance 4 are less than the second preset threshold, the center point whose confidence level order is 3 is discarded).

In this way, the text recognition apparatus determines, based on whether a distance between a to-be-sampled center point and a center point determined to be sampled is greater than or equal to the second preset threshold, whether to perform sampling, and finally obtains the m center points through sampling. The to-be-sampled center point may be a center point of the center points determined by the text recognition apparatus in S6022 other than the center point determined to be sampled and a discarded center point.

Manner 3: The text recognition apparatus may divide, in a length direction of a center line, the center line into m curve segments based on a preset curve length, and determine a center point with a highest confidence level in each curve segment. Therefore, the text recognition apparatus determines the m center points on the center line. The text recognition apparatus connects the determined vertex pair corresponding to each center point to obtain a connection line corresponding to the center point, and sequentially connects vertices of obtained connection lines to obtain the initial target text detection area. The preset length may be set based on an actual situation. This is not limited in this embodiment of this application.

Manner 4: The text recognition apparatus may divide, in a length direction of a center line, the center line into q curve segments based on a preset curve length, and sort confidence levels of all center points in each curve segment in descending order. Then, the text recognition apparatus determines a center point whose order is greater than or equal to k. Therefore, the text recognition apparatus determines q*k (q*k=m) center points on the center line. The text recognition apparatus connects the determined vertex pair corresponding to each center point to obtain a connection line corresponding to the center point, and sequentially connects vertices of obtained connection lines to obtain the initial target text detection area. A preset duration and a sorting value k may be set based on an actual situation. This is not limited in this embodiment of this application.

It should be noted herein that, if the text recognition apparatus connects the center points determined in S6022, the curve (namely, the center line in S6022) may be obtained. When the text recognition apparatus performs sampling at intervals in Manner 2 or Manner 4, both of a center point corresponding to a start point of the curve and a center point corresponding to an end point of the curve are reserved and used to obtain the initial target text detection area.

In addition, in an actual application, the center line may be a pixel-level curve, and the center point on the center line exists in a form of a pixel. In the foregoing example, a distance between the center points presented in FIG. 7 is large. This is to exemplarily describe a process in which the text recognition apparatus determines, based on the center point, the connection line corresponding to the center point, and generates the initial target text detection area based on the connection line. Therefore, the foregoing description does not constitute a limitation on this embodiment of this application.

In addition, because the center line has the specific width (for example, the width is W), the width W of the center line includes p center points. Therefore, at a location, vertex pairs corresponding to the p center points are the same, and a connection line of the vertex pair corresponds to the p center points.

Figure 8:
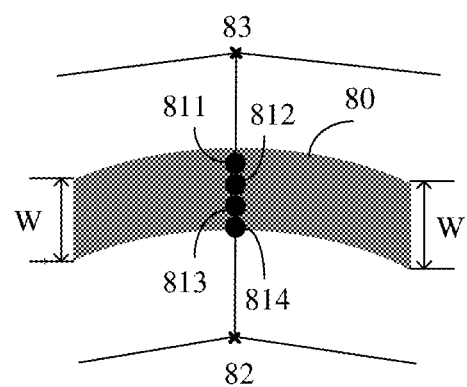
FIG. 8 is a schematic diagram 5 of a text recognition method according to an embodiment of this application.

For example, as shown in FIG. 8, a width of a center line 80 is W, and the center line 80 includes four center points: 811, 812, 813, and 814. The four center points correspond to one vertex pair, namely, a vertex 83 and a vertex 82.

In addition, the method for determining the vertex of the initial target text detection area by the text recognition apparatus is merely an example for description, and does not constitute a limitation on the protection scope of this embodiment of this application. All methods for determining the vertex of the initial target text detection area based on the confidence level of the center point output by the text detection network fall within the protection scope of this embodiment of this application.

S6024 (optional): The text recognition apparatus performs smoothing processing on the initial target text detection area to obtain the target text detection area.

Specifically, sawteeth may exist in the initial target text detection area obtained by the text recognition apparatus in S6023. Therefore, in S6024, the text recognition apparatus performs smoothing processing on the initial target text detection area by using a smoothing algorithm to obtain the target text detection area. Compared with the initial target text detection area, the target text detection area has no sawtooth.

The text recognition apparatus may perform smoothing processing on the initial target text detection area by using a Savitzky-Golay smoothing algorithm or a B-spline smoothing algorithm to obtain the target text detection area. For specific implementations of the Savitzky-Golay smoothing algorithm and the B-spline smoothing algorithm, refer to the conventional technology. This is not limited in this embodiment of this application.

Figure 9A:
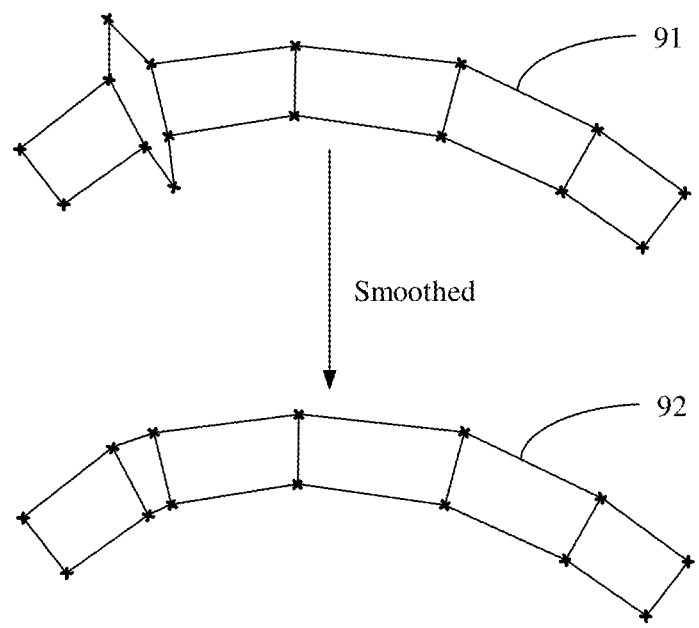
FIG. 9a is a schematic diagram 6 of a text recognition method according to an embodiment of this application.

For example, as shown in FIG. 9a, the initial target text detection area may be 91, and the smoothed target text detection area may be 92.

It can be learned that the target text detection area determined by the text recognition apparatus according to the foregoing steps S6021 to S6024 is a polygonal area, the target text detection area includes the target text in the to-be-detected image, and one target text detection area includes only one line of text.

The polygonal area includes the m vertex pairs, where m is a positive integer greater than 2, the m vertex pairs are located on two sides of the center line formed by the m center points, and the center line passes through all text in the target text detection area.

Optionally, the polygonal area may be in a strip shape. Each strip-shaped target text detection area includes one row of text, a height of the strip-shaped target text detection area is a height in a text height direction, and a length of the strip-shaped target text detection area is a length in a text horizontal width direction.

The strip-shaped polygonal area may be a horizontal strip-shaped polygonal area, a vertical strip-shaped polygonal area, or an oblique strip-shaped polygonal area. This is not limited in this embodiment of this application. The horizontal strip-shaped polygonal area means that the strip-shaped polygonal area extends in a horizontal direction, the vertical strip-shaped polygonal area means that the strip-shaped polygonal area extends in a vertical direction (relative to the horizontal direction), and the oblique strip-shaped polygonal area means that the strip-shaped polygonal area extends obliquely.

It should be noted that a horizontal strip-shaped polygonal area, a vertical strip-shaped polygonal area, and an oblique strip-shaped polygonal area may all be strip-shaped polygonal areas of various curved shapes.

Figure 9B:
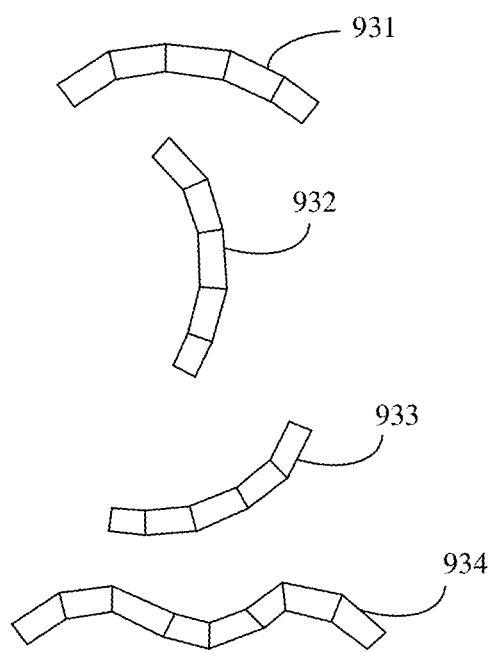
FIG. 9b is a schematic diagram 7 of a text recognition method according to an embodiment of this application.

For example, as shown in FIG. 9b, 931 shows a horizontal strip-shaped polygonal area in a fan shape, and 934 shows a horizontal strip-shaped polygonal area in a wavy shape. 932 shows a vertical strip-shaped polygonal area in a fan shape. 933 shows an oblique strip-shaped polygonal area in a fan shape.

In addition, the text recognition apparatus may further determine the target text detection area in the to-be-detected image by using a shape robust text detection algorithm based on a progressive size scalable network, a universal algorithm for image skeletonization and a review of thinning techniques (a universal algorithm for image skeletonization and a review of thinning techniques, K3M), and an edge extraction algorithm of OpenCV.

For the shape robust text detection algorithm based on the progressive size scalable network, the K3M, and the edge extraction algorithm of OpenCV, refer to description in the conventional technology. Details are not described herein in this embodiment of this application.

Specifically, the text recognition apparatus may determine the target text area in the to-be-detected image by using the shape robust text detection algorithm based on the progressive size scalable network.

Then, the text recognition apparatus determines the center line of the target text area by using the K3M.

The text recognition apparatus determines a target text area box of the target text area by using the edge extraction algorithm of OpenCV.

Further, the text recognition apparatus determines a pair of intersection points at which a straight line passing through any center point on the center line intersects the determined target text area box. The pair of intersection points is one vertex pair located on a boundary of the target text detection area. The straight line passing through any center point on the center line is perpendicular to a tangent line of the point on the center line.

Optionally, the text recognition apparatus may determine, starting from the start point of the determined center line (the start point may be an endpoint of any end of the center line), a vertex pair corresponding to the start point. Then, the text recognition apparatus determines a vertex pair corresponding to a center point that is separated from the start point by d pixels. The text recognition apparatus determines a vertex pair corresponding to a center point that is separated from the start point by 2d pixels. The text recognition apparatus determines a vertex pair corresponding to the end point of the center line (the end point may be an endpoint that is different from the start point and that is at the other end of the center line). Herein, the text recognition apparatus determines the m vertex pairs in total. Then, the text recognition apparatus connects all determined vertex pairs to obtain a connection line corresponding to vertex pairs corresponding to the plurality of center points. Finally, the text recognition apparatus sequentially connects vertices on the obtained connection line to obtain the target text detection area. d is a positive integer. A value of d may be set based on an actual situation. This is not specifically limited in this embodiment of this application.

Optionally, the text recognition apparatus may evenly divide the determined center line into m−1 line segments, and determine an endpoint of each line segment. Then, the text recognition apparatus determines vertex pairs (m vertex pairs in total) corresponding to each endpoint. Then, the text recognition apparatus connects all determined vertex pairs to obtain a connection line corresponding to the vertex pairs corresponding to each endpoint. Finally, the text recognition apparatus sequentially connects vertices on the obtained connection line to obtain the target text detection area. m is a positive integer greater than 2.

S603: The text recognition apparatus corrects the polygonal area to m−1 rectangular areas to obtain a corrected target text detection area.

The text recognition apparatus may divide the target text detection area into m−1 quadrilateral areas that do not overlap each other based on vertex locations of the polygonal target text detection area. Any quadrilateral area is obtained based on two adjacent vertex pairs in the m vertex pairs of the polygon.

Then, the text recognition apparatus respectively corrects the m−1 quadrilateral areas that do not overlap each other to the m−1 rectangular areas.

Specifically, the text recognition apparatus inputs, into a preset algorithm (for example, a perspective transformation algorithm), vertex locations of the m−1 quadrilateral areas that do not overlap each other and the to-be-detected image to obtain the m−1 rectangular areas. Alternatively, the text recognition apparatus inputs, into the preset algorithm (for example, the perspective transformation algorithm), the vertex locations of the m−1 quadrilateral areas that do not overlap each other and any feature map obtained from the to-be-detected image by using the text detection network, to obtain the m−1 rectangular areas.

The any feature map obtained from the to-be-detected image by using the text detection network is any feature map obtained by performing convolution on the to-be-detected image by the text detection network after the to-be-detected image is input into the text detection network and before the feature maps of the five channels are output. The feature map may include s channels, and s is a positive integer. Because the feature map also includes text information of the text area, the target text may be also recognized by using the text recognition algorithm based on the any feature map.

Figure 10:
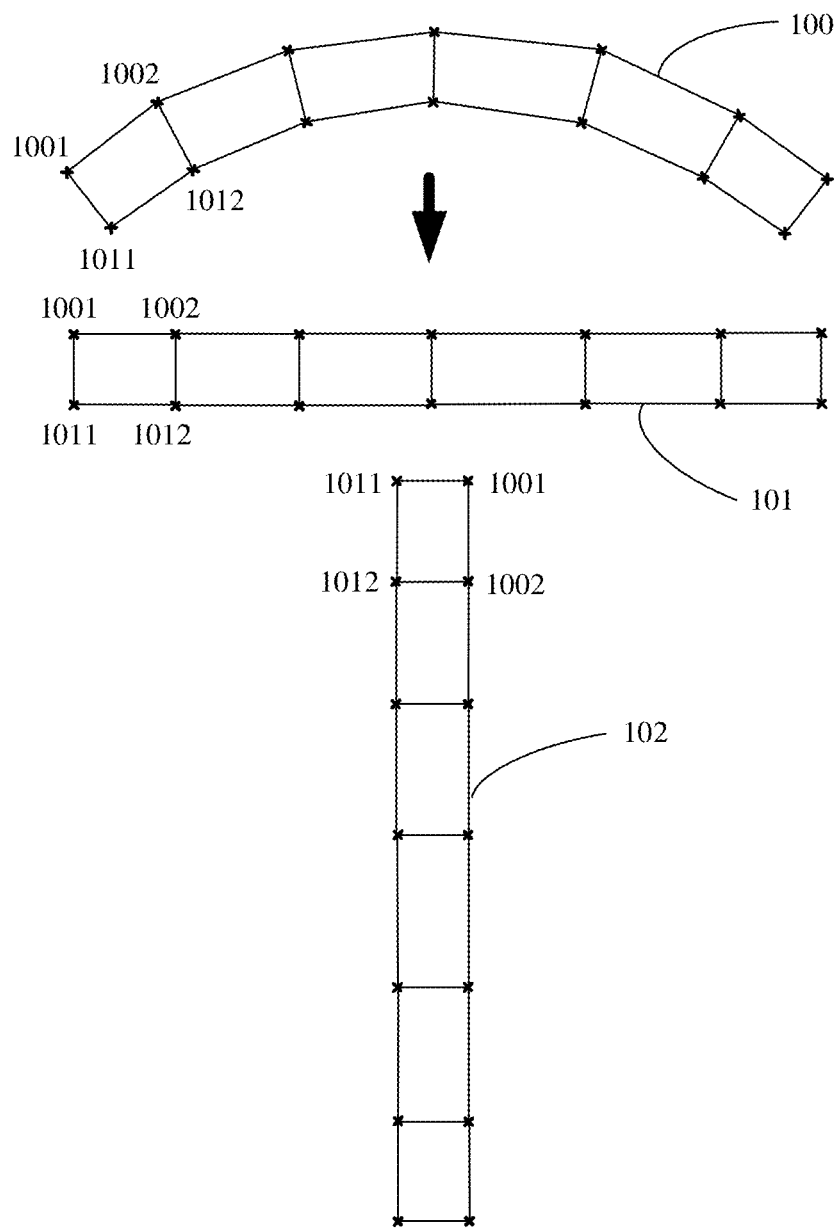
FIG. 10 is a schematic diagram 8 of a text recognition method according to an embodiment of this application.

FIG. 10 shows a process of correcting the polygonal target text detection area to the rectangular area.

As shown in FIG. 10, the text recognition apparatus may first correct any quadrilateral area in the target text detection area to the rectangular area.

For example, the text recognition apparatus first corrects a quadrilateral area whose vertices are (1001, 1011, 1012, 1002) to the rectangular area. Specifically, the text recognition apparatus may use the four points (1001, 1011, 1012, 1002) as anchor points, and solve a transformation matrix to obtain a rectangle using (1001, 1011, 1012, 1002) as vertices. A width of the rectangle obtained through correction may be a width of a side formed by vertices (1001, 1002), a width of a side formed by vertices (1011, 1012), or an average width of the side formed by the vertices (1001, 1002) and the side formed by the vertices (1011, 1012). Similarly, a height of the rectangle obtained through correction may be a height of a side formed by vertices (1001, 1011), a height of a side formed by vertices (1002, 1012), or an average height of the side formed by the vertices (1001, 1011) and the side formed by the vertices (1002, 1012). This is not limited in this embodiment of this application.

Similarly, the text recognition apparatus corrects all remaining quadrilateral areas of the target text detection area to rectangular areas. For a specific correction manner, refer to the foregoing description. Details are not described herein again.

Further, the text recognition apparatus splices the m−1 rectangular areas obtained through correction to obtain a rectangular target text detection area.

It may be understood that the text recognition apparatus may sequentially correct and splice, starting from a quadrilateral area formed by the connection line of the vertex pair corresponding to the start point of the center line, a plurality of quadrilateral areas in the target text detection area.

The text recognition apparatus may further first number the plurality of quadrilateral areas forming the target text detection area. Then, the text recognition apparatus randomly corrects the quadrilateral area in the target text detection area, and numbers a rectangular area obtained through correction. When splicing the m−1 rectangular areas obtained through correction into the rectangular target text detection area, the text recognition apparatus sequentially splices, based on a number of each rectangular area obtained through correction, the m−1 rectangular areas into the rectangular target text detection area.

The number of each rectangular area obtained through correction corresponds to a number of each quadrilateral area of the target text detection area.

Optionally, the text recognition apparatus may sequentially splice, in a horizontal direction, the m−1 rectangular areas obtained through correction, to obtain a rectangular target text detection area in the horizontal direction.

Optionally, the text recognition apparatus may further sequentially splice, in a vertical direction, the m−1 rectangular areas obtained through correction, to obtain a rectangular target text detection area in the vertical direction.

It may be understood that the text recognition apparatus may determine, based on a shape of the target text detection area, to splice, in the horizontal direction or in the vertical direction, the m−1 rectangular areas obtained through correction. If the target text detection area is in a horizontal strip shape, the text recognition apparatus may splice, in the horizontal direction, the m−1 rectangular areas obtained through correction. If the target text detection area is in a vertical strip shape, the text recognition apparatus may splice, in the vertical direction, the m−1 rectangular areas obtained through correction. If the target text detection area is in an oblique strip shape, the text recognition apparatus may splice, in the horizontal direction or in the vertical direction according to a preset rule or based on a slope of the oblique strip shape, the m−1 rectangular areas obtained through correction. This is not limited in this embodiment of this application.

For example, as shown in FIG. 10, a polygonal area 100 is divided into six quadrilateral areas. After the text recognition apparatus separately corrects the six quadrilateral areas, if the six rectangular areas obtained through correction are spliced in the horizontal direction, a rectangular target text detection area 101 is obtained. To be specific, the text recognition apparatus corrects the target text detection area to the rectangular target text detection area 101 in the horizontal direction. If the six rectangles obtained through correction are spliced in the vertical direction, a rectangular target text detection area 102 is obtained. To be specific, the text recognition apparatus corrects the target text detection area to the rectangular target text detection area 102 in the vertical direction.

It may be understood that, when correcting each quadrilateral area, the text recognition apparatus first crops the quadrilateral area from the to-be-detected image, and then corrects the quadrilateral area to the rectangle. In this way, after the text recognition apparatus corrects the plurality of quadrilateral areas in the target text detection area to rectangles and splices the rectangles into the rectangular target text detection area, the rectangular target text detection area includes the target text.

In addition, the text recognition apparatus further needs to determine whether the height of the target text detection area meets a requirement of the text recognition algorithm. If the height of the target text detection area meets the requirement of the text recognition algorithm, after correcting the target text detection area to the rectangle, the text recognition apparatus performs the following S604. If the height of the target text detection area does not meet the requirement of the text recognition algorithm, the text recognition apparatus scales the target text detection area proportionally.

In an actual application, a height of a text detection box required by the text recognition algorithm is fixed, for example, 32 pixels or 64 pixels. Therefore, the text recognition apparatus scales the target text detection area proportionally based on the height of the text detection box required by the text recognition algorithm, so that the corrected target text detection area meets the requirement of the text recognition algorithm.

It may be understood that the foregoing determining whether the height of the target text detection area meets the requirement of the text recognition algorithm and an occasion at which the text recognition apparatus scales the target text detection area proportionally when the height of the target text detection area does not meet the requirement of the text recognition algorithm are not specifically limited in this embodiment of this application.

Specifically, in this embodiment of this application, the foregoing scaling process may be performed when the text recognition apparatus corrects each quadrilateral area to the rectangle; in this embodiment of this application, the foregoing scaling process may be performed after the text recognition apparatus corrects each quadrilateral area to the rectangular area; in this embodiment of this application, the foregoing scaling process may be performed when the text recognition apparatus splices all the rectangular areas obtained through correction into the rectangular target text detection area; or in this embodiment of this application, the foregoing scaling process may be performed after the text recognition apparatus splices all the rectangular areas obtained through correction into the rectangular target text detection area.

S604: The text recognition apparatus performs text recognition on the corrected target text detection area.

Specifically, the text recognition apparatus inputs the corrected target text detection area that meets the height requirement of the text recognition algorithm into a preset text recognition algorithm, to recognize the target text in the target text detection area.

For example, the text recognition apparatus may input the corrected target text detection area that meets the height requirement of the text recognition algorithm into an end-to-end trainable neural network for image-based sequence recognition and its application to scene text recognition (an end-to-end trainable neural network for image-based sequence recognition and its application to scene text recognition, CRNN), to recognize the target text in the target text detection area.

For a specific process of recognizing the target text in the target text detection area by using the CRNN, refer to the conventional technology. Details are not described in this embodiment of this application.

Certainly, the text recognition apparatus may further input the corrected target text detection area that meets the height requirement of the text recognition algorithm into another existing text recognition algorithm, to recognize the target text in the target text detection area. This is not limited in this embodiment of this application.

S605: The text recognition apparatus outputs the target text.

Optionally, the text recognition apparatus outputs the target text, and may render the target text in a preset area on the to-be-detected image to display the target text.

Specifically, if the text recognition apparatus is a terminal with a display, the text recognition apparatus may display, on the display of the text recognition apparatus, the to-be-detected image on which the target text is rendered.

Optionally, the text recognition apparatus may display the target text in the target text detection area in the to-be-detected image.

Figure 11A:
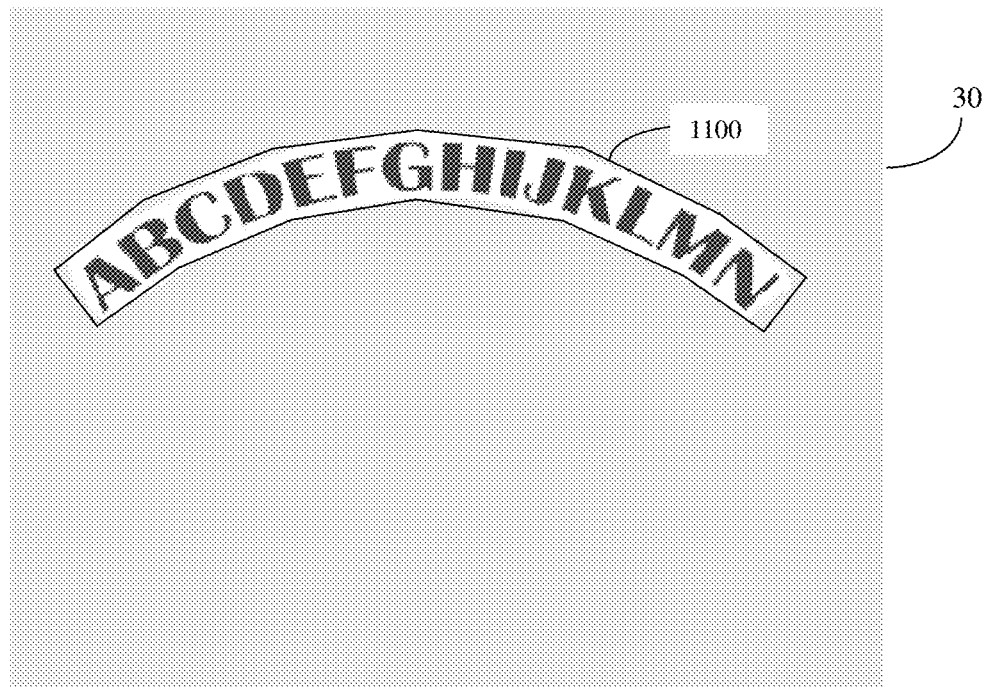
FIG. 11a(a) and FIG. 11a(b) are a schematic diagram 9 of a text recognition method according to an embodiment of this application.
Figure 11A:
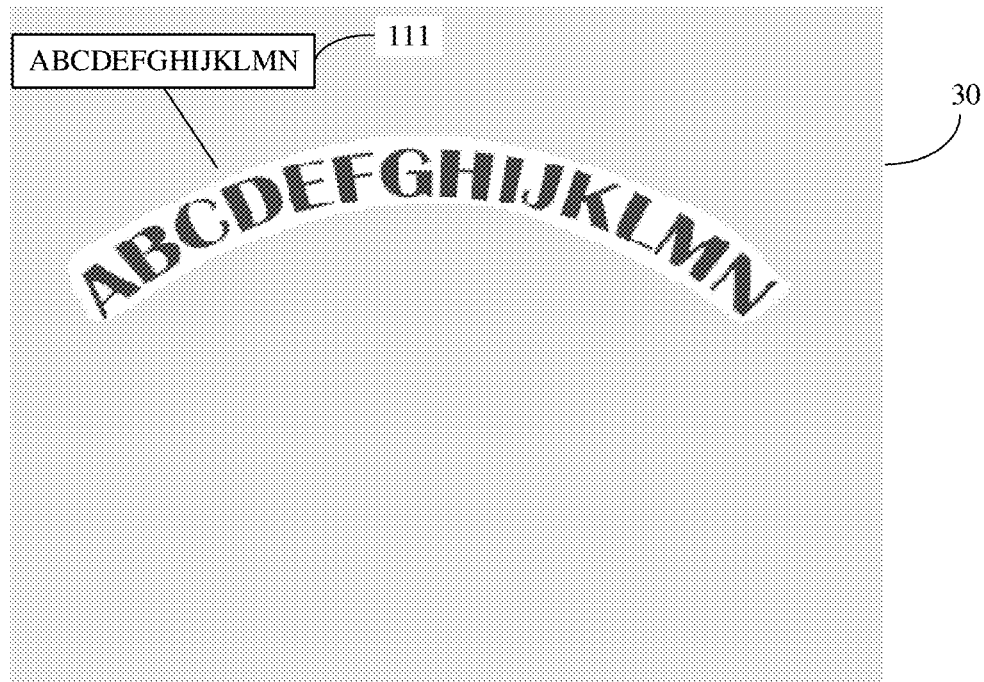

For example, as shown in FIG. 11a(a), if the text recognition apparatus is the terminal with the display, the text recognition apparatus displays target text "ABCDEF-GHUKLMN" in a target text detection area 1100 on a to-be-detected image 30. In this case, alternatively, as shown in FIG. 11a(a), the target text detection area 1100 may be displayed on the to-be-detected image 30 in a form of a frame. Then, the text recognition apparatus displays the to-be-detected image 30 on the display of the text recognition apparatus.

Certainly, when displaying the target text detection area 1100 on the to-be-detected image 30, the text recognition apparatus may display the target text detection area 1100 in a frame manner, or may display the target text detection area 1100 by using a filling background color. Alternatively, the target text detection area 1100 is displayed in any other manner in which the target text detection area 1100 can be distinguished from the to-be-detected image 30. Certainly, alternatively, the target text detection area 1100 may not include the frame or the filling background color, and is only transparently suspended on the to-be-detected image 30. This is not specifically limited in this embodiment of this application.

When displaying the recognized target text "ABCDEFGHLIKLMN" on the to-be-detected image 30, the text recognition apparatus may display the recognized target text in any color and font. A font of the recognized target text "ABCDEFGHIJKLMN" may be the same as or different from a font of the target text in the to-be-detected image 30. A color of the recognized target text "ABCDEFGHIJKLMN" may be the same as or different from a color of the target text in the to-be-detected image 30. This is not specifically limited in this embodiment of this application.

Optionally, the text recognition apparatus may further use a comment in the target text detection area in the to-be-detected image, to display the target text at any location in the to-be-detected image.

For example, as shown in FIG. 11a(b), if the text recognition apparatus is the terminal with the display, the text recognition apparatus displays, in an upper left corner of the to-be-detected image 30, a comment 111 in which the target text "ABCDEFGHIJKLMN" is displayed, and displays the to-be-detected image 30 on the display of the text recognition apparatus.

Certainly, although the foregoing text recognition method provided in this embodiment of this application is described by using recognition of the curved text as an example, the tilted text may still be recognized by using the text recognition method provided in this embodiment of this application. For a specific process of recognizing the tilted text in an image, refer to the foregoing description of S601 to S605. Details are not described herein again.

Further, to verify reliability of the text recognition method provided in this application, the text recognition method is verified.

Specifically, as shown in Table 1, a terminal side indicates that a portable terminal device such as a mobile phone is configured to identify the curved text, and a cloud side indicates that a computing device such as a cloud server is configured to identify the curved text. Because a computing capability of the mobile phone is far lower than a computing capability of the cloud server, a more complex text detection algorithm and recognition algorithm may usually run on the cloud side, and a result on the cloud side is usually better than a result on the terminal side.

However, a result on a terminal side in this application is still better than a result on a cloud side of a competitor by using the text recognition method provided in this embodiment of this application.

TABLE 1

| Scenario | This application (terminal side) | Competitor 1 (cloud side) | Competitor 2 (cloud side) | Competitor 3 (cloud side) |
|---|---|---|---|---|
| Chinese curved text | 85.53% | 81.71% | 78.19% | 74.11% |
| English curved text | 89.82% | 85.17% | 80.09% | 80.38% |

For ease of understanding, the following provides description with reference to a specific example.

Figure 11B:
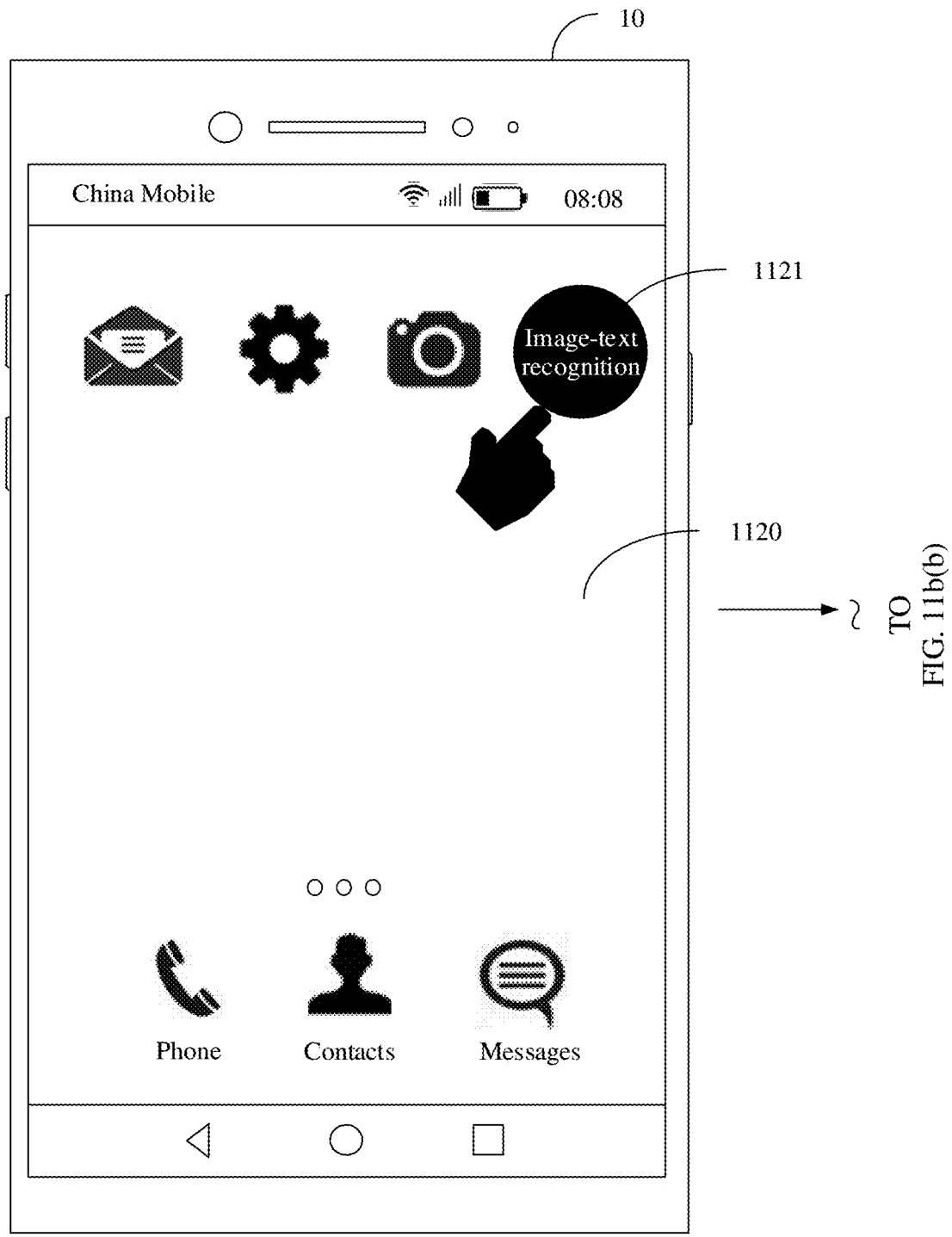
FIG. 11b(a), FIG. 11b(b), FIG. 11b(c), and FIG. 11b(d) are a schematic diagram 10 of a text recognition method according to an embodiment of this application.
Figure 11B:
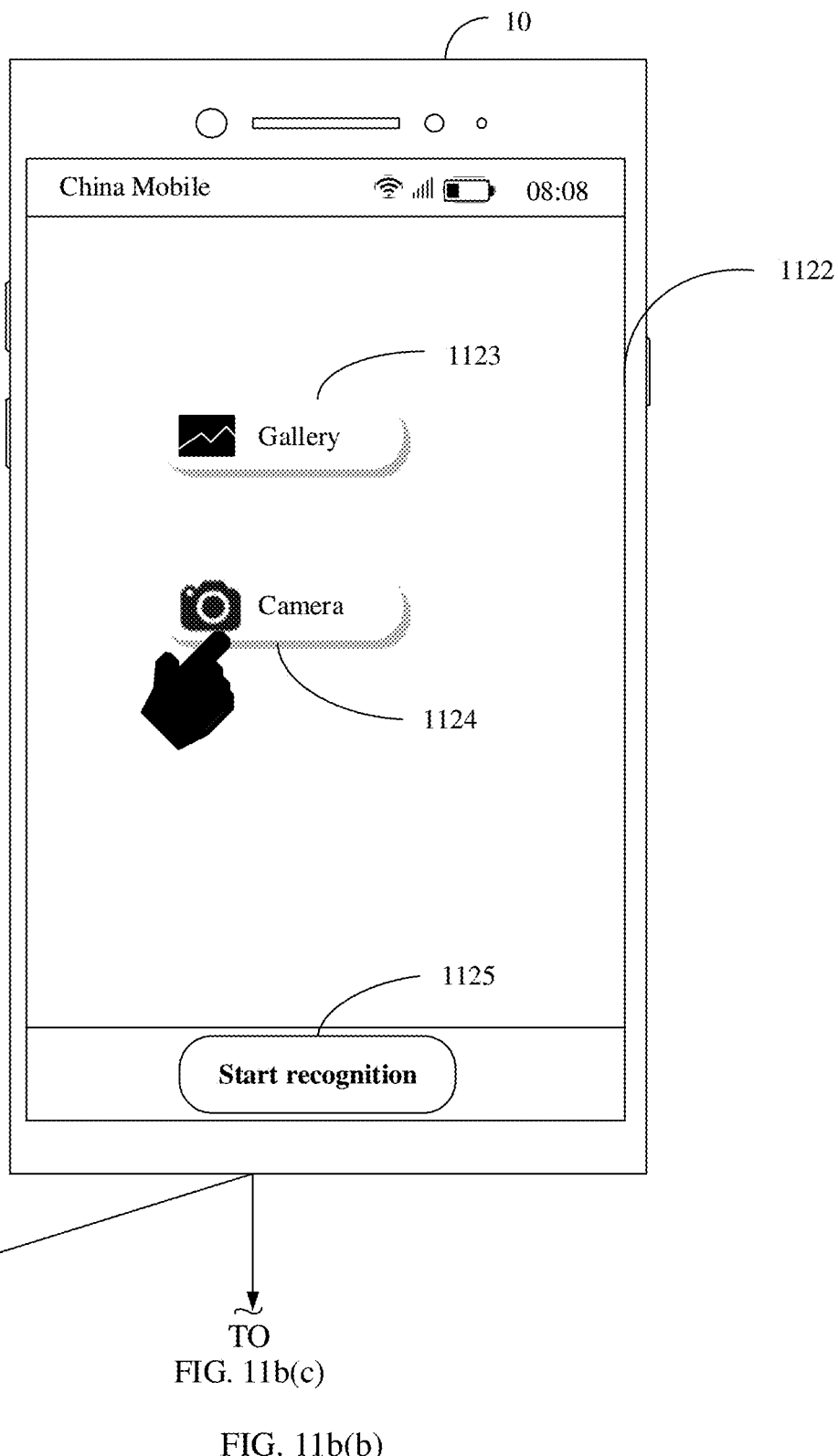
Figure 11B:
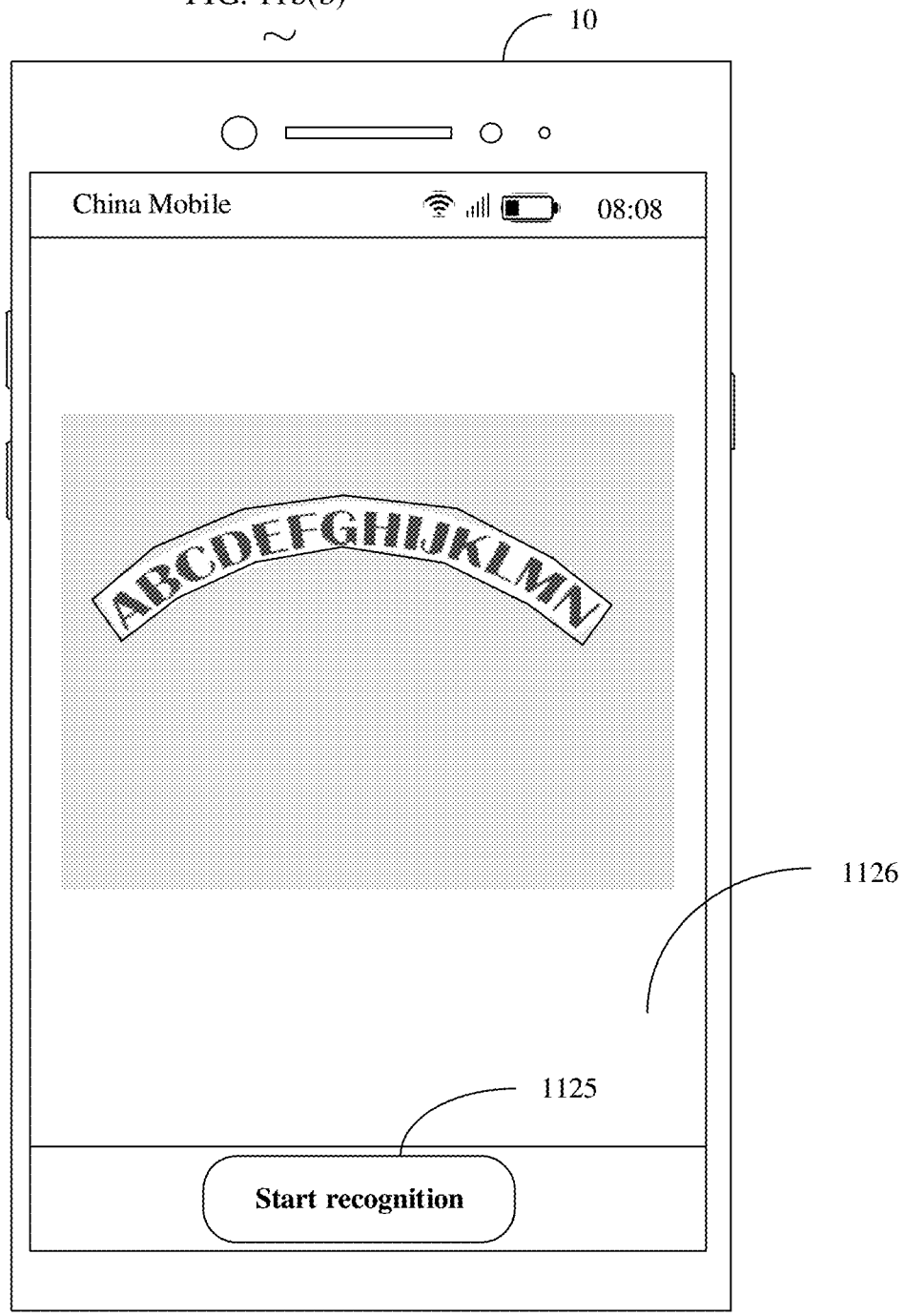
Figure 11B:
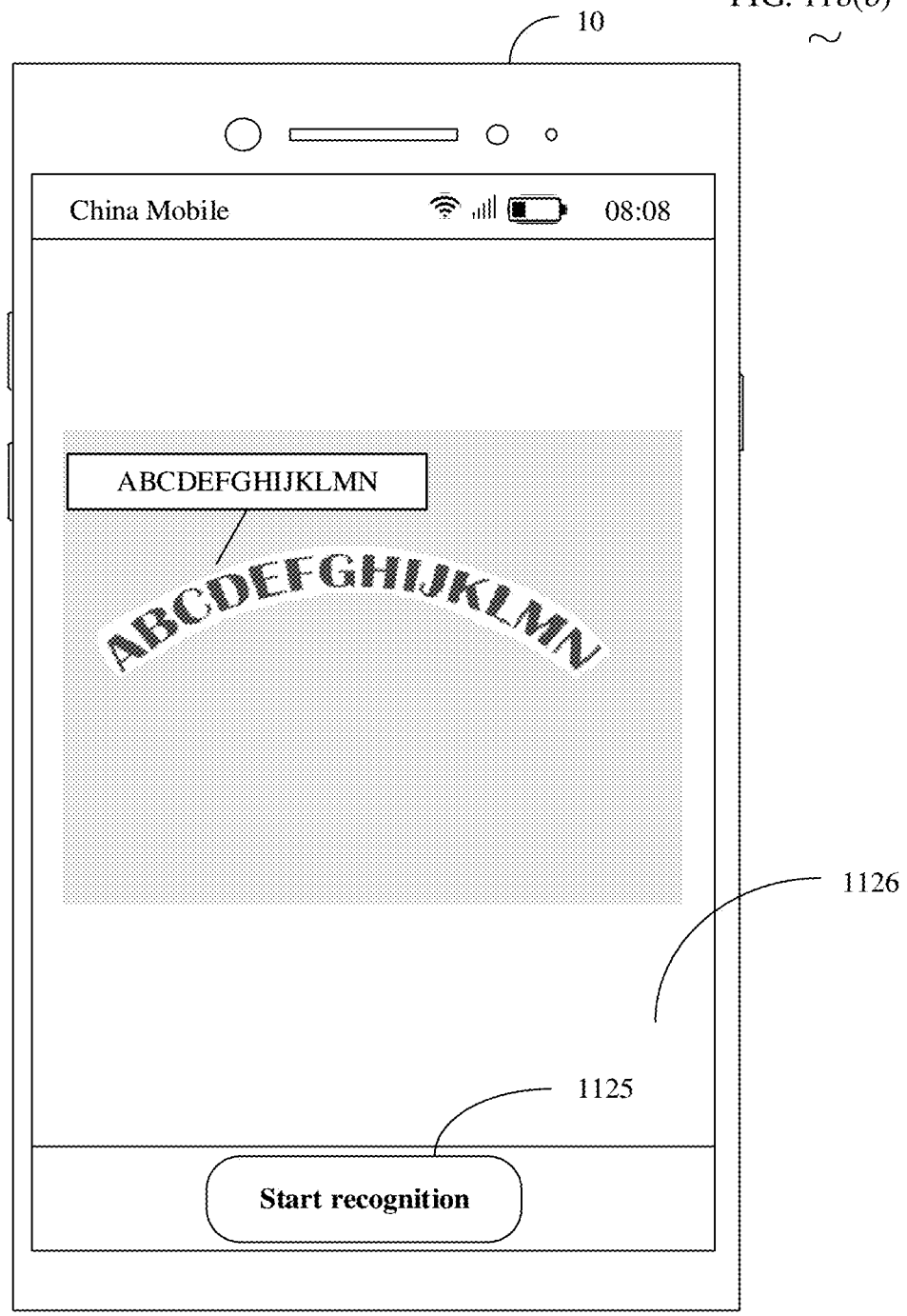

Refer to FIG. 11b(a), FIG. 11b(b), FIG. 11b(c), and FIG. 11b(d). An example in which the text recognition apparatus is the mobile phone 10, a text recognition application program "image-text recognition" 1121 is installed in the mobile phone 10, a to-be-detected image is the image 30 shown in FIG. 3, a user A obtains the image 30 through instant photographing, and the text recognition application program recognizes the text in the image 30 is used for description.

As shown in FIG. 11b(a), the user A taps an icon of the text recognition application program "image-text recognition" 1121 on a display interface 1120 (desktop) of the mobile phone 10, to enter an application interface 1122 of the text recognition application program. Then, as shown in FIG. 11b(b), the user A taps a "camera" icon 1124 on the application interface 1122, and obtains the to-be-detected image 30 through instant photographing.

Certainly, the user A may also select, from a gallery, an image as the to-be-detected image by using a "gallery" icon 1123 on the application interface 1122, and recognize text in the image by using the text recognition application program. Herein, the gallery includes an image taken by a camera of the mobile phone 10, an image downloaded from a network, an image transmitted through Bluetooth, an image sent by social software, a video screenshot in a video, a screen snapshot, and the like.

Herein, an example in which the user obtains the image 30 through instant photographing is used for description. After obtaining the image 30 through instant photographing, the user A taps a "start recognition" button 1125 on the application interface 1122. Then, the text recognition application program executes the text recognition method described in S601 to S605, and outputs recognized text.

Optionally, as shown in FIG. 11b(c), the mobile phone 10 may display the recognized text on an image display interface 1126 in a manner in FIG. 11a(a). In this case, the recognized text is displayed in the target text detection area in the image 30, the target text detection area is also displayed on the image 30 in the form of the frame, and the image 30 is displayed on the image display interface 1126.

Optionally, as shown in FIG. 11b(d), the mobile phone 10 may also display the recognized text on the image display interface 1126 in a manner in FIG. 11a(b). In this case, the recognized text is displayed in the upper left corner of the image 30 in a form of a comment, and the image 30 is displayed on the image display interface 1126.

Certainly, the mobile phone 10 may alternatively display the image 30 and the recognized text on the image display interface 1126 in any other manner. This is not limited in this embodiment of this application.

In the foregoing description, the text recognition method provided in this embodiment of this application may be implemented by using a device, for example, a terminal or a server. Certainly, the text recognition method provided in this embodiment of this application may alternatively be implemented through interaction between a client (for example, a terminal) and a server (for example, a server). The following describes a text recognition method provided in an embodiment of this application in this scenario.

Figure 11C:
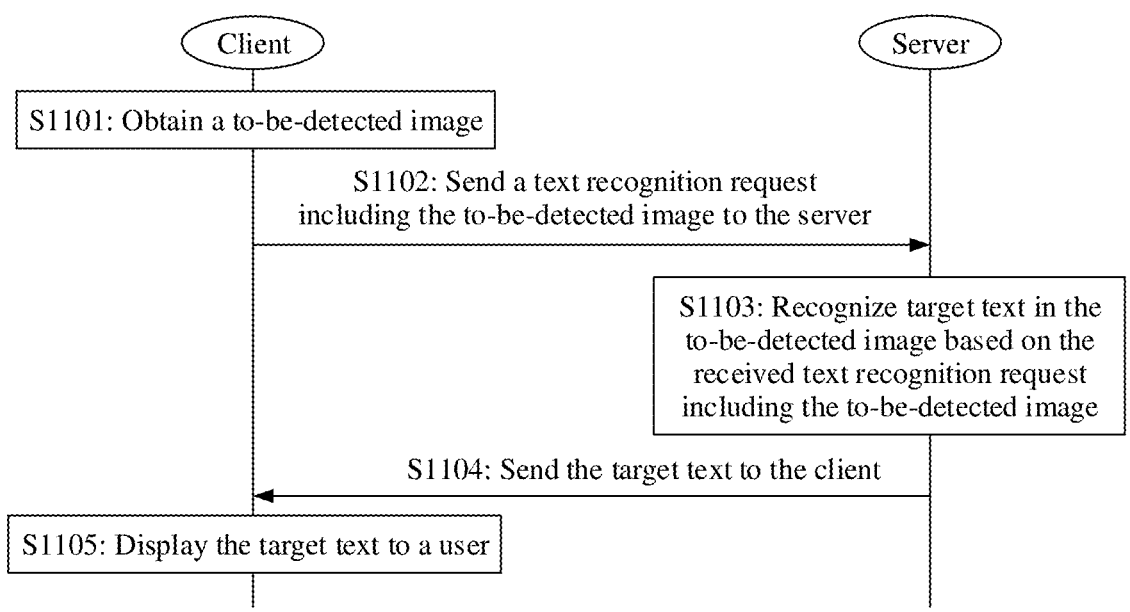
FIG. 11c is a schematic flowchart 3 of a text recognition method according to an embodiment of this application.

FIG. 11c is a schematic flowchart of implementing, through interaction between a client and a server, a text recognition method according to an embodiment of this application. The text recognition method includes the following steps.

S1101: The client obtains a to-be-detected image.

Specifically, the client may obtain the to-be-detected image with reference to the description of S601.

S1102: The client sends a text recognition request including the to-be-detected image to the server.

After obtaining the to-be-detected image, the client sends the text recognition request including the to-be-detected image to the server.

In response to an operation of the client, the server receives the text recognition request including the to-be-detected image.

S1103: The server recognizes target text in the to-be-detected image based on the received text recognition request including the to-be-detected image.

Specifically, with reference to the foregoing steps S602 to S604, the server may recognize the target text in the to-be-detected image based on the received text recognition request including the to-be-detected image.

S1104: The server sends the target text to the client.

After recognizing the target text in the to-be-detected image, the server may display the target text on the to-be-detected image, and send the target text to the client. Alternatively, the server may only send the recognized target text to the client. This is not limited in this embodiment of this application.

In response to an operation of the server, the client receives the target text.

S1105: The client displays the target text to the user.

The client displays the received target text to the user.

If the server displays the target text on the to-be-detected image, when the server sends the target text to the client, the client directly displays the to-be-detected image to the user. If the server only sends the recognized target text to the client, the client displays the target text on the to-be-detected image, and displays the to-be-detected image to the user.

For a specific manner in which the client displays the target text on the to-be-detected image, refer to the description in S605. Details are not described herein again.

In conclusion, this embodiment of this application provides the text recognition method. By using a pre-trained text detection network, a text recognition apparatus accurately recognizes a curved target text area on the to-be-detected image, and obtains a polygonal target text detection area. The polygonal target text detection area has m vertex pairs, and the polygon includes (m−1) quadrilaterals. Then, the text recognition apparatus separately corrects the (m−1) quadrilaterals to rectangles and splices the rectangles, to obtain the target text detection area that is corrected to a rectangle. Further, the text recognition apparatus inputs the corrected target text detection area into a preset text recognition algorithm, to recognize target text in the target text detection area. Compared with a conventional technology, in the text recognition method provided in this embodiment of this application, the area in which the target text is located can be accurately detected by using the pre-trained text detection network, and the corrected target text detection area is obtained by separately correcting the (m−1) quadrilaterals to the rectangles and splicing the rectangles. A distortion rate of text is effectively reduced, and accuracy of recognizing curved text is improved.

The foregoing mainly describes the solutions provided in embodiments of this application from a perspective of a method. To implement the foregoing functions, the apparatus includes corresponding hardware structures and/or software modules for performing the functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function module division may be performed on the text recognition apparatus based on the foregoing method example. For example, function modules may be obtained through division corresponding to functions, or two or more functions may be integrated into one processing module. The integrated module may be implemented in a form of hardware, or may be implemented in a form of a software function module. It should be noted that, in embodiments of this application, the module division is used as an example, and is merely a logical function division. In an actual implementation, another division manner may be used.

Figure 12:
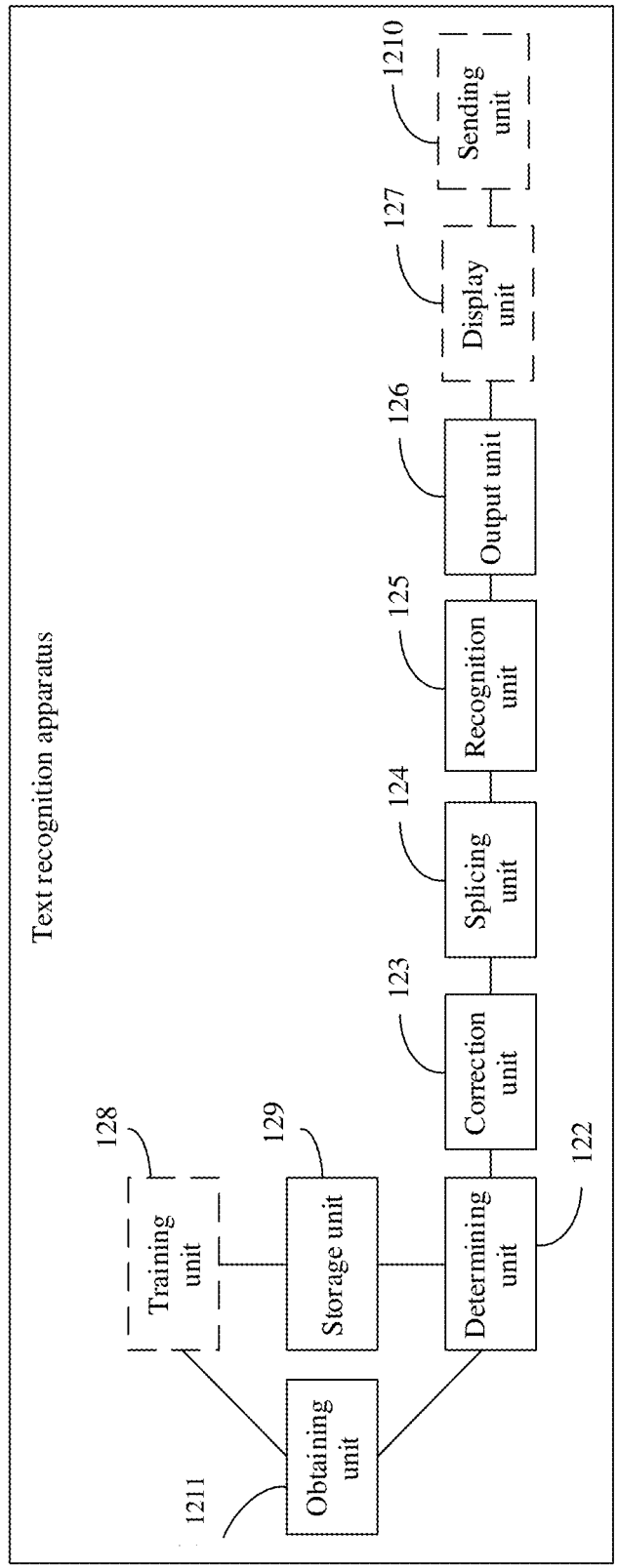
FIG. 12 is a schematic diagram of a structure of a text recognition apparatus according to an embodiment of this application.

FIG. 12 is a schematic diagram of a structure of a text recognition apparatus according to an embodiment of this application. The text recognition apparatus is configured to: train a text detection network, determine a target text detection area in a to-be-detected image, and correct and recognize target text in the target text detection area, for example, configured to perform the method shown in FIG. 2 or FIG. 6. The text recognition apparatus may include an obtaining unit 1211, a determining unit 122, a correction unit 123, a recognition unit 125, and an output unit 126.

The obtaining unit 1211 is configured to obtain the to-be-detected image. The determining unit 122 determines the target text detection area in the to-be-detected image obtained by the obtaining unit 1211, where the target text detection area includes the target text in the to-be-detected image, the target text detection area is a polygonal area, the polygonal area includes m vertex pairs, m is a positive integer greater than 2, m vertices are located on one side of the target text, and other m vertices are located on another side of the target text. The correction unit 123 is configured to correct the polygonal area to m−1 rectangular areas to obtain a corrected target text detection area. The recognition unit 125 is configured to perform text recognition on the corrected target text detection area. The output unit 126 is configured to output the target text recognized by the recognition unit 125.

For example, with reference to FIG. 6, the obtaining unit 1211 may be configured to perform S601, the determining unit 122 may be configured to perform S602, the correction unit 123 may be configured to perform S603, the recognition unit 125 may be configured to perform S604, and the output unit 126 may be configured to perform S605.

Optionally, the polygonal area is in a strip shape.

Optionally, the obtaining unit 1211 is specifically configured to: obtain the to-be-detected image that is instantly photographed by a user, or select the to-be-detected image from stored images.

For example, with reference to FIG. 6, the obtaining unit 1211 may be configured to perform S601.

Optionally, the determining unit 122 is specifically configured to determine the target text detection area based on the to-be-detected image and a pre-trained text detection network.

For example, with reference to FIG. 6, the determining unit 122 may be configured to perform S602.

Optionally, the determining unit 122 is specifically configured to: input the to-be-detected image into the text detection network to obtain an initial target text detection area; and perform smoothing processing on the initial target text detection area to obtain the target text detection area.

For example, with reference to FIG. 6, the determining unit 122 may be configured to perform S602, and S602 may specifically include S6021 to S6024.

Optionally, the text recognition apparatus further includes a training unit 128.

The training unit 128 is configured to perform pre-training based on a training image of a marked text area to obtain the text detection network. The text area includes text in the training image.

For example, with reference to FIG. 2, the training unit 128 may be configured to perform S203.

Optionally, the determining unit 122 is further configured to: determine a segmentation label based on a preset segmentation label task algorithm and the training image, where the segmentation label indicates a center line of the text in the training image, and determine a regression label based on a preset regression label task algorithm, the segmentation label determined by the determining unit 122, and the training image, where the regression label indicates a plurality of vertex pairs, and a connection line between vertices in any one of the plurality of vertex pairs intersects the center line. The training unit 128 is specifically configured to perform training based on the training image, and the segmentation label and the regression label that are determined by the determining unit 122 to obtain the text detection network.

For example, with reference to FIG. 2, the determining unit 122 and the training unit 128 may be configured to perform S203.

Optionally, an intersection point at which the connection line between the vertices in the vertex pair intersects the center line is a first intersection point, a value of an included angle between the connection line and a tangent line of the first intersection point is 90±A degrees, and A is less than or equal to 15.

Optionally, the correction unit 123 is specifically configured to:
divide the polygonal area into m−1 quadrilateral areas that do not overlap each other, where any quadrilateral area is obtained based on two adjacent vertex pairs in the m vertex pairs, vertices in each of the m vertex pairs are located on two sides of a center line of the target text detection area, and a midpoint of a connection line between the vertices in the vertex pair is located on the center line; and
respectively correct the m−1 quadrilateral areas that do not overlap each other to the m−1 rectangular areas.

For example, with reference to FIG. 6, the correction unit 123 may be configured to perform S603.

Optionally, the text recognition apparatus further includes a splicing unit 124.

The splicing unit 124 is configured to: sequentially splice, in a horizontal direction, the m−1 rectangular areas obtained by the correction unit 123 through correction to obtain a rectangular target text detection area, or sequentially splice, in a vertical direction, the m−1 rectangular areas obtained by the correction unit 123 through correction to obtain a rectangular target text detection area.

For example, with reference to FIG. 6, the splicing unit 124 may be configured to perform S603.

Optionally, the text recognition apparatus further includes a display unit 127.

The display unit 127 is configured to display the target text that is in a preset area in the to-be-detected image and that is recognized by the recognition unit 125.

Optionally, the text recognition apparatus further includes a sending unit 1210.

The sending unit 1210 is configured to send, to the client, the target text recognized by the recognition unit 125.

For example, with reference to FIG. 11c, the sending unit 1210 may be configured to perform S1104.

Certainly, the text recognition apparatus provided in this embodiment of this application includes but is not limited to the foregoing units. For example, the text recognition apparatus may further include a storage unit 129. The storage unit 129 may be configured to store program code of the text recognition apparatus, and may be further configured to cache data in a running process of the text recognition apparatus.

In an example, with reference to FIG. 1a, a function implemented by the obtaining unit 1211 in the text recognition apparatus is the same as functions of the camera 193, the mobile communications module 150, and the wireless communications module 160 in FIG. 1a. Functions implemented by the determining unit 122, the correction unit 123, the splicing unit 124, the recognition unit 125, and the training unit 128 are the same as a function of the processor 110 in FIG. 1a. A function implemented by the storage unit 129 is the same as a function of the internal memory 121 in FIG. 1a. Functions implemented by the output unit 126 and the display unit 127 may be the same as a function implemented by the display 194 in FIG. 1a.

Figure 13:
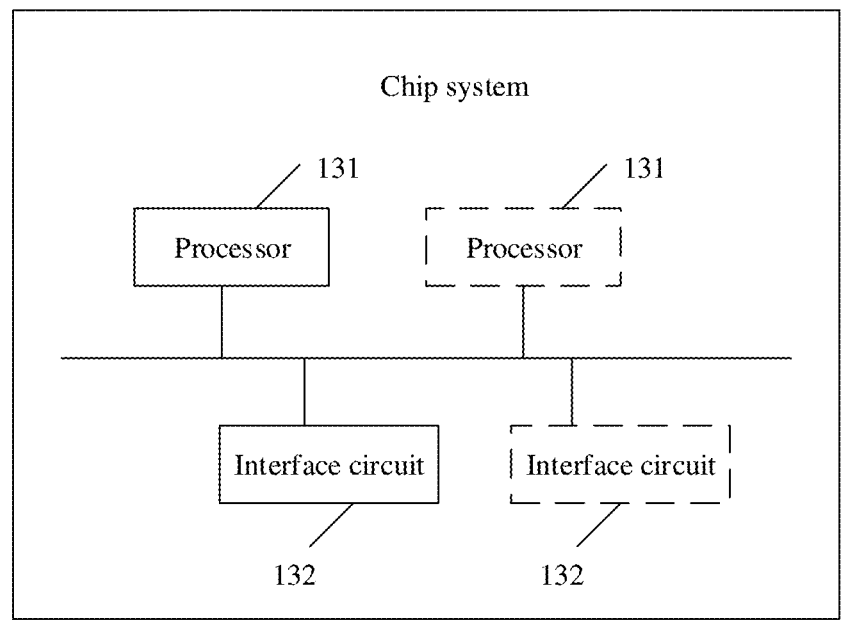
FIG. 13 is a schematic diagram of a structure of a chip system according to an embodiment of this application.

An embodiment of this application further provides a chip system. As shown in FIG. 13, the chip system includes at least one processor 131 and at least one interface circuit 132. The processor 131 and the interface circuit 132 may be interconnected by using a line. For example, the interface circuit 132 may be configured to receive a signal from another apparatus (for example, a memory of a text recognition apparatus). For another example, the interface circuit 132 may be configured to send a signal to another apparatus (for example, the processor 131). For example, the interface circuit 132 may read instructions stored in the memory, and send the instructions to the processor 131. When the instructions are executed by the processor 131, the text recognition apparatus may be enabled to perform the steps in the foregoing embodiments. Certainly, the chip system may further include another discrete device. This is not specifically limited in this embodiment of this application.

Another embodiment of this application further provides a computer-readable storage medium. The computer-readable storage medium stores instructions. When the instructions are run on a text recognition apparatus, the text recognition apparatus performs the steps performed by the text recognition apparatus in the method procedure shown in the foregoing method embodiment.

In some embodiments, the disclosed method may be implemented as computer program instructions encoded in a machine-readable format on a computer-readable storage medium or encoded on another non-transitory medium or product.

Figure 14:
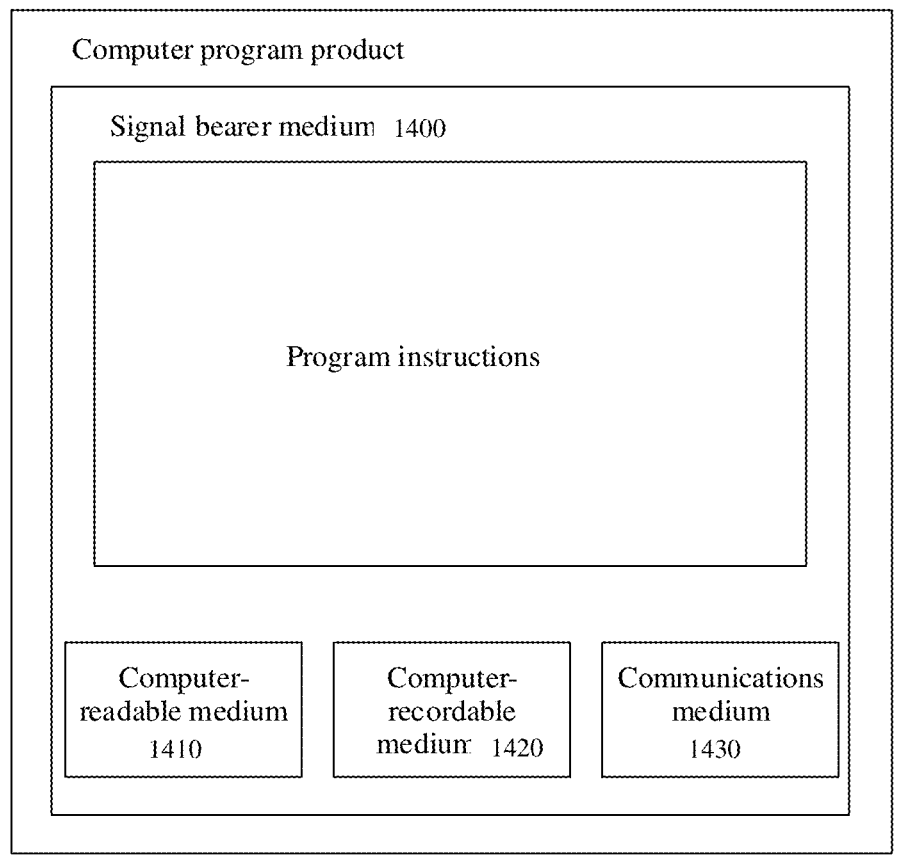
FIG. 14 is a schematic diagram of a structure of a computer program product according to an embodiment of this application.

FIG. 14 schematically shows a conceptual partial view of a computer program product according to an embodiment of this application. The computer program product includes a computer program configured to execute a computer process on a computing device.

In an embodiment, the computer program product is provided using a signal bearer medium 1400. The signal bearer medium 1400 may include one or more program instructions. When the program instructions are run by one or more processors, the functions or some of the functions described in FIG. 2 or FIG. 6 may be provided. Therefore, for example, one or more features of S601 to S605 in FIG. 6 may be borne by one or more instructions associated with the signal bearer medium 1400. In addition, the program instructions in FIG. 14 also describe example instructions.

In some examples, the signal bearer medium 1400 may include a computer-readable medium 1410, for example, but not limited to, a hard disk drive, a compact disc (CD), a digital video disc (DVD), a digital tape, a memory, a read-only memory (ROM), or a random access memory (RAM).

In some implementations, the signal bearer medium 1400 may include a computer-recordable medium 1420, such as but not limited to a memory, a read/write (R/W) CD, and an R/W DVD.

In some implementations, the signal bearer medium 1400 may include a communications medium 1430, such as but not limited to a digital and/or analog communications medium (for example, an optical fiber cable, a waveguide, a wired communications link, or a wireless communications link).

The signal bearer medium 1400 may be conveyed by using the communications medium 1430 (for example, a wireless communications medium that complies with the IEEE 802.11 standard or another transmission protocol) in a wireless form. The one or more program instructions may be, for example, computer-executable instructions or logic implementation instructions.

In some examples, the text recognition apparatus described in FIG. 2 or FIG. 6 may be configured to provide various operations, functions, or actions in response to the computer-readable medium 1410, the computer-recordable medium 1420, and/or one or more program instructions in the communications medium 1430.

It should be understood that the arrangement described herein is merely used as an example. Therefore, a person skilled in the art understands that other arrangements or other elements (for example, a machine, an interface, a function, a sequence, and a function group) can be used instead, and that some elements may be omitted based on an expected result. In addition, a plurality of the described elements are functional entities that can be implemented as discrete or distributed components, or implemented in any suitable combination at any suitable location in combination with another component.

All or some of foregoing embodiments may be implemented by using software, hardware, firmware, or any combination thereof. When a software program is used to implement embodiments, all or a part of embodiments may be implemented in a form of a computer program product. The computer program product includes one or more computer instructions. When computer-executable instructions are loaded and executed on a computer, the procedures or functions according to embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing description is merely a specific implementation of this application. Any variation or replacement readily figured out by a person skilled in the art based on the specific implementations provided in this application shall fall within the protection scope of this application.

What is claimed is:

1. A text recognition method, comprising:
   obtaining a to-be-detected image;
   determining a target text detection area in the to-be-detected image, wherein the target text detection area comprises target text in the to-be-detected image, the target text detection area is a polygonal area, the polygonal area comprises m vertex pairs, m is a positive integer greater than 2, and each of the m vertex pairs comprises two vertices including a vertex located on one side of the target text and another vertex located on another side of the target text, so that m vertices are located on one side of the target text, and other m vertices are located on another side of the target text;
   correcting the polygonal area to m−1 rectangular areas to obtain a corrected target text detection area based on the m vertex pairs; and
   performing text recognition on the corrected target text detection area to determine the target text, and outputting the target text,
   wherein the determining of the target text detection area in the to-be-detected image comprises:
   determining a plurality of candidate center points in the to-be-detected image and a vertex pair corresponding to each of the plurality of candidate center points, wherein each of the plurality of candidate center points is associated with a confidence level indicating likelihood of the associated candidate center point being a center point in the target text detection area in a text height direction; and
   determining, based on the confidence level of each of the plurality of candidate center points, center points forming a center line of the target text detection area, wherein the center line passes though all pieces of text in the target text detection area.

2. The text recognition method according to claim 1, wherein
   the polygonal area is in a strip shape.

3. The text recognition method according to claim 1, wherein the to-be-detected image is photographed by a user, or selected from stored images.

4. The text recognition method according to claim 1, wherein the determining a target text detection area in the to-be-detected image comprises:
   determining the target text detection area based on the to-be-detected image and a pre-trained text detection network.

5. The text recognition method according to claim 4, wherein the determining of the target text detection area based on the to-be-detected image and the pre-trained text detection network comprises:
   inputting the to-be-detected image into the pre-trained text detection network to obtain an initial target text detection area; and
   performing smoothing processing on the initial target text detection area to obtain the target text detection area.

6. The text recognition method according to claim 4, wherein the text recognition method further comprises:
performing pre-training based on a training image of a marked text area to obtain the pre-trained text detection network, wherein the marked text area comprises text in the training image.

7. The text recognition method according to claim 1, wherein the correcting the polygonal area to m−1 rectangular areas comprises:
dividing the polygonal area into m−1 quadrilateral areas that do not overlap each other, wherein any quadrilateral area is obtained based on two adjacent vertex pairs in the m vertex pairs,
the two vertices included in each of the m vertex pairs are located on two sides of the center line of the target text detection area, and a midpoint of a connection line between the two vertices in the vertex pair is located on the center line; and
respectively correcting the m−1 quadrilateral areas that do not overlap each other to the m−1 rectangular areas.

8. The text recognition method according to claim 1, wherein the correcting the polygonal area to m−1 rectangular areas to obtain the corrected target text detection area comprises:
sequentially splicing the m−1 rectangular areas in a horizontal direction to obtain the corrected target text detection area; or
sequentially splicing the m−1 rectangular areas in a vertical direction to obtain the corrected target text detection area.

9. The text recognition method according to claim 1, wherein the outputting the target text comprises:
displaying the target text in a preset area in the to-be-detected image.

10. The text recognition method according to claim 1, wherein the text recognition method further comprises:
sending the target text to a client.

11. The text recognition method according to claim 1, wherein the determination of the center points forming the center line of the target text detection area comprises determining center points, in the plurality of candidate center points, whose confidence levels are greater than a second threshold and in which a distance between every two center points is less than a first threshold.

12. A text recognition apparatus, comprising:
at least one processor; and
one or more memories coupled to the at least one processor and storing programming instructions for execution by the at least one processor to cause the apparatus to:
obtain a to-be-detected image;
determine a target text detection area in the to-be-detected image, wherein the target text detection area comprises target text in the to-be-detected image, the target text detection area is a polygonal area, the polygonal area comprises m vertex pairs, m is a positive integer greater than 2, and each of the m vertex pairs comprises two vertices including a vertex located on one side of the target text and another vertex located on another side of the target text, so that m vertices are located on one side of the target text, and other m vertices are located on another side of the target text;
correct the polygonal area to m−1 rectangular areas to obtain a corrected target text detection area based on the m vertex pairs; and
perform text recognition on the corrected target text detection area to determine the target text, and output the target text,
wherein the determining of the target text detection area in the to-be-detected image comprises:
determining a plurality of candidate center points in the to-be-detected image and a vertex pair corresponding to each of the plurality of candidate center points, wherein each of the plurality of candidate center points is associated with a confidence level indicating likelihood of the associated candidate center point being a center point in the target text detection area in a text height direction; and
determining, based on the confidence level of each of the plurality of candidate center points, center points forming a center line of the target text detection area, wherein the center line passes though all pieces of text in the target text detection area.

13. The text recognition apparatus according to claim 12, wherein
the polygonal area is in a strip shape.

14. The text recognition apparatus according to claim 12, wherein the to-be-detected image is photographed by a user, or selected from stored images.

15. The text recognition apparatus according to claim 12, wherein the programming instructions, when executed by the at least one processor, further cause the apparatus to:
determine the target text detection area based on the to-be-detected image and a pre-trained text detection network.

16. The text recognition apparatus according to claim 15, wherein the programming instructions, when executed by the at least one processor, further cause the apparatus to:
input the to-be-detected image into the pre-trained text detection network to obtain an initial target text detection area; and
perform smoothing processing on the initial target text detection area to obtain the target text detection area.

17. The text recognition apparatus according to claim 12, wherein the programming instructions, when executed by the at least one processor, further cause the apparatus to:
divide the polygonal area into m−1 quadrilateral areas that do not overlap each other, wherein any quadrilateral area is obtained based on two adjacent vertex pairs in the m vertex pairs,
the two vertices included in each of the m vertex pairs are located on two sides of the center line of the target text detection area, and a midpoint of a connection line between the two vertices in the vertex pair is located on the center line; and
respectively correct the m−1 quadrilateral areas that do not overlap each other to the m−1 rectangular areas.

18. The text recognition apparatus according to claim 12, wherein the correcting the polygonal area to m−1 rectangular areas to obtain the corrected target text detection area comprises:
sequentially splicing the m−1 rectangular areas in a horizontal direction to obtain the corrected target text detection area, or sequentially splicing the m−1 rectangular areas in a vertical direction to obtain the corrected target text detection area.

19. The text recognition apparatus according to claim 12, wherein the outputting the target text comprises:
displaying the target text that is in a preset area in the to-be-detected image.

20. The text recognition apparatus according to claim 12, wherein the programming instructions, when executed by the at least one processor, further cause the apparatus to send the target text to a client.

21. A non-transitory storage medium storing computer program code, wherein the computer program code comprises computer instructions, and when the computer instructions are executed by at least one processor, the at least one processor is enabled to perform operations comprising:

obtaining a to-be-detected image;

determining a target text detection area in the to-be-detected image, wherein the target text detection area comprises target text in the to-be-detected image, the target text detection area is a polygonal area, the polygonal area comprises m vertex pairs, m is a positive integer greater than 2, and each of the m vertex pairs comprises two vertices including a vertex located on one side of the target text and another vertex located on another side of the target text, so that m vertices are located on one side of the target text, and other m vertices are located on another side of the target text;

correcting the polygonal area to m−1 rectangular areas to obtain a corrected target text detection area based on the m vertex pairs; and performing text recognition on the corrected target text detection area to determine the target text, and outputting the target text, wherein the determining of the target text detection area in the to-be-detected image comprises:

determining a plurality of candidate center points in the to-be-detected image and a vertex pair corresponding to each of the plurality of candidate center points, wherein each of the plurality of candidate center points is associated with a confidence level indicating likelihood of the associated candidate center point being a center point in the target text detection area in a text height direction; and determining, based on the confidence level of each of the plurality of candidate center points, center points forming a center line of the target text detection area, wherein the center line passes though all pieces of text in the target text detection area.

\* \* \* \* \*

UNITED STATES PATENT AND TRADEMARK OFFICE
CERTIFICATE OF CORRECTION

| | | |
|---|---|---|
| PATENT NO. | : 11,893,767 B2 | Page 1 of 1 |
| APPLICATION NO. | : 17/837231 | |
| DATED | : February 6, 2024 | |
| INVENTOR(S) | : Jieming Li et al. | |

It is certified that error appears in the above-identified patent and that said Letters Patent is hereby corrected as shown below:

In the Claims

Column 34, Claim 1, Line 33, change "though" to --through.--; and

Column 36, Claim 12, Line 18, change "though" to --through.--.

Signed and Sealed this
Twenty-seventh Day of August, 2024

Katherine Kelly Vidal
*Director of the United States Patent and Trademark Office*